United States Patent
Ma et al.

(10) Patent No.: US 10,417,528 B2
(45) Date of Patent: Sep. 17, 2019

(54) ANALYTIC SYSTEM FOR MACHINE LEARNING PREDICTION MODEL SELECTION

(71) Applicant: SAS Institute Inc., Cary, NC (US)

(72) Inventors: Yongjin Ma, Cary, NC (US); Xinmin Wu, Cary, NC (US); Xiaomei Liu, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/059,241

(22) Filed: Aug. 9, 2018

(65) Prior Publication Data

US 2019/0258904 A1 Aug. 22, 2019

Related U.S. Application Data

(60) Provisional application No. 62/647,649, filed on Mar. 24, 2018, provisional application No. 62/631,848, filed on Feb. 18, 2018.

(51) Int. Cl.
| | |
|---|---|
| *G06F 15/18* | (2006.01) |
| *G06K 9/62* | (2006.01) |
| *G06F 17/18* | (2006.01) |
| *G06N 20/00* | (2019.01) |

(52) U.S. Cl.
CPC .......... *G06K 9/6263* (2013.01); *G06F 17/18* (2013.01); *G06K 9/623* (2013.01); *G06K 9/6256* (2013.01); *G06K 9/6261* (2013.01); *G06N 20/00* (2019.01)

(58) Field of Classification Search
CPC ................................ G06F 16/28; G06N 20/00
USPC ...................................................... 706/15, 45
See application file for complete search history.

(56) References Cited

U.S. PATENT DOCUMENTS

| | | | |
|---|---|---|---|
| 8,712,929 B1* | 4/2014 | Bickford | G01D 3/022 706/12 |
| 2007/0031003 A1* | 2/2007 | Cremers | G06K 9/6207 382/103 |

OTHER PUBLICATIONS

Fawcett, Tom, An introduction to ROC analysis, Pattern Recognition Letters 27, Dec. 19, 2005, pp. 861-874.
Pozzolo et al, Calibrating Probability with Undersampling for Unbalanced Classification, Conference Paper, ResearchGate, Dec. 2015, pp. 1-9.
(Continued)

*Primary Examiner* — David R Vincent
(74) *Attorney, Agent, or Firm* — Bell & Manning, LLC

(57) ABSTRACT

An assessment dataset is selected from an input dataset using a first stratified sampling process based on a value of an event assessment variable. A remainder of the input dataset is allocated to a training/validation dataset that is partitioned into an oversampled training/validation dataset using an oversampling process based on a predefined value of the event assessment variable. A validation sample is selected from the oversampled training/validation dataset using a second stratified sampling process based on the value of the event assessment variable. A training sample is selected from the oversampled training/validation dataset using the second stratified sampling process based on the value of the event assessment variable. The validation sample and the training sample are mutually exclusive. A predictive type model is trained using the selected training sample. A plurality of predictive type models are trained, validated, and scored using the samples to select a best predictive model.

30 Claims, 19 Drawing Sheets

(56) References Cited

OTHER PUBLICATIONS

Pozzolo et al, Credit Card Fraud Detection and Concept-Drift Adaptation with Delayed Supervised Information, 2015 International Joint Conference on Neural Networks, Jul. 12, 2015, pp. 1-8.
Chawla, Nitech, Data Mining for Imbalanced Datasets: An Overview, Chapter 40—Data Mining and Knowledge Discovery Handbook, 2004, pp. 853-867.
Powers, D.M.W, Evaluation: from Precision, Recall and F-measure to ROC, Informedness, Markedness and Correlation, Journal of Machine Learning Technologies, 2(1), 2011, pp. 37-63.
Derby, Nate, Managing and Monitoring Statistical Models, SAS Global Forum 2013, Paper 19-2003, 2014, pp. 1-13.
Saito et al., The Precision-Recall Plot Is More Informative than the ROC Plot When Evaluating Binary Classifiers on Imbalanced Datasets, PLOS ONE, Mar. 4, 2015, pp. 1-21.
Davis, et al., The Relationship Between Precision-Recall and ROC Curves, Technical Report #1551, Jan. 2006, pp. 1-11.
SAS® Visual Data Mining and Machine Learning 8.1 Programming Guide Autotune Action Set, Chapter 8—The Autotune Action Set, 2017, pp. 61-103.
SAS® Visual Data Mining and Machine Learning 8.1 Data Mining and Machine Learning Procedures, , Mar. 2017, pp. 1-329.
SAS® Visual Data Mining and Machine Learning 8.1 Statistical Procedures, Chapter 11—The TREESPLIT Procedure, Sep. 2016, pp. 414-464.
SAS® Event Stream Processing 5.2: Overview, Product Overview, 2018, pp. 1-12.
SAS® Event Stream Processing 5.2: Using SAS® Event Stream Processing Analytics, , 2018, pp. 1-110.

\* cited by examiner

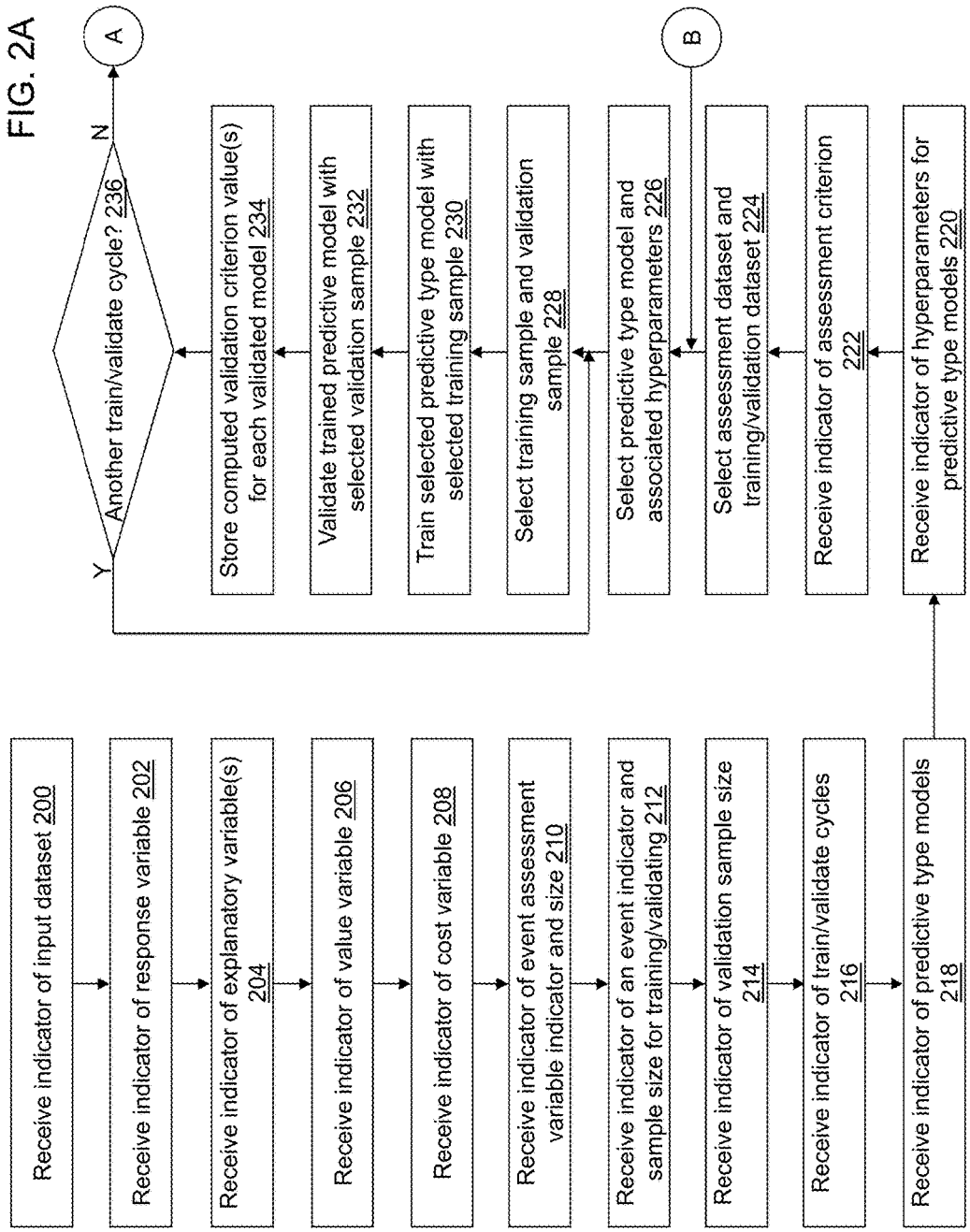

| 1702 | 1704 | 1706 | 1708 | 1710 | 1712 | 1714 | 1716 |
|---|---|---|---|---|---|---|---|
| Forest with autotune | 5367.40 | 0.8291 | 0.8119 | 0.8090 | 0.9789 | 0.00067 | 0.9300 |
| GBM without autotune | 5364.85 | 0.9941 | 0.8066 | 0.9990 | 0.9562 | 0.00061 | 0.9990 |
| GBM with autotune | 5362.42 | 0.9783 | 0.7957 | 0.9810 | 0.9571 | 0.00067 | 0.9810 |
| Forest without autotune | 5354.18 | 0.7113 | 0.8132 | 0.7820 | 0.9730 | 0.00060 | 0.8230 |
| NNET SGD with autotune | 4743.98 | 0.5398 | 0.6995 | 0.5960 | 0.9659 | 0.00095 | 0.8290 |
| SVM without autotune | 2822.08 | 0.5983 | 0.4048 | 0.6680 | 0.9609 | 0.00200 | 0.8130 |
| SVM with autotune | 2822.08 | 0.5983 | 0.4048 | 0.6680 | 0.9609 | 0.00200 | 0.8130 |
| Tree without autotune | 33.89 | 0.9790 | 0.1238 | 0.9780 | 0.9282 | 0.00172 | 0.9990 |
| Tree with autotune | -10.00 | 1.0000 | 0.1714 | 0.9990 | 0.9433 | 0.01476 | 0.9990 |

FIG. 17

ANALYTIC SYSTEM FOR MACHINE LEARNING PREDICTION MODEL SELECTION

CROSS-REFERENCE TO RELATED APPLICATIONS

The present application claims the benefit of 35 U.S.C. § 111(e) to U.S. Provisional Patent Application No. 62/647,649 filed on Mar. 24, 2018, and 35 U.S.C. § 111(e) to U.S. Provisional Patent Application No. 62/631,848 filed on Feb. 18, 2018, the entire contents of which are hereby incorporated by reference.

BACKGROUND

Model assessment is a critical step in the process of predictive model machine learning techniques. Because the input data used to train a predictive model may include events that are relatively rare, oversampling of the input data is commonly used to pre-process the input data. The oversampled data is partitioned into training and validation datasets in which a training dataset is used to develop the predictive model, and the validation dataset is used to assess the trained model's performance. For model assessment, traditional assessments include a misclassification rate, an area under a receiver operating curve (ROC) (AUC), an F1 statistic, etc.

Many widely used predictive model assessment metrics are derived from a confusion matrix that is calculated based on an event decision threshold selected for the predictive model to indicate whether an event type has or has not occurred. For example, an event type may be a fraud event type, a device failure event type, etc. where occurrence of the event type is rare compared to occurrence of the non-event type such as a non-fraud event type, a device normal operating mode event type, etc. For illustration, the device may be a sensor, a computer, an industrial machine, a power transformer, an engine, an ATM machine, a pump, a compressor, etc.

There are primarily three limitations using this traditional approach. First, the dataset for model assessment is oversampled resulting in a very different distribution from the original input data that included certain types of events rarely. Second, the traditional assessments for traditional supervised learning models do not include objectives that include value/cost minimization based on misclassifications. Third, some traditional assessments do not determine a threshold probability value for prediction, which is critical to using a deployed predictive model.

SUMMARY

In an example embodiment, a non-transitory computer-readable medium is provided having stored thereon computer-readable instructions that, when executed by a computing device, cause the computing device to provide training and selection of a predictive model. An input dataset that includes a plurality of observation vectors is read. Each observation vector of the plurality of observation vectors includes an explanatory variable value for an explanatory variable, a response variable value for a response variable, and a value of an event assessment variable. An assessment dataset is selected from the input dataset using a first stratified sampling process based on the value of the event assessment variable of each observation vector. A remainder of the input dataset is allocated to a training/validation dataset. The training/validation dataset is partitioned into an oversampled training/validation dataset using an oversampling process based on a predefined value of the event assessment variable.

(a) A validation sample is selected from the oversampled training/validation dataset using a second stratified sampling process based on the value of the event assessment variable. (b) A training sample is selected from the oversampled training/validation dataset using the second stratified sampling process based on the value of the event assessment variable. The validation sample and the training sample are mutually exclusive. (c) A predictive type model is trained using the selected training sample. The predictive type model is trained to predict the response variable value of each observation vector included in the selected training sample based on a respective explanatory variable value of each observation vector. (d) The trained predictive type model is validated using the selected validation sample to compute a validation criterion value for the trained predictive type model that quantifies a validation error. (e) The validated predictive type model is scored using the selected assessment dataset to compute a probability value for each observation vector and to compute an assessment criterion value for the validated predictive type model that quantifies a predictive performance capability for the validated predictive type model. (f) The computed assessment criterion value, a hyperparameter, model characteristics that define a trained model of the predictive type model, and the computed probability value for each observation vector of the selected assessment dataset are stored to the computer-readable medium. (c) to (f) are repeated for at least one additional predictive type model. A best predictive model is determined based on the stored, computed assessment criterion value of each validated predictive type model. The hyperparameter and the model characteristics that define the trained model of the predictive type model associated with the determined best predictive model are output for predicting a new response variable value from a new observation vector.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to provide training and selection of a predictive model.

In yet another example embodiment, a method of providing training and selection of a predictive model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 2A, 2B, and 2C depict a flow diagram illustrating examples of operations performed by a predictive model selection application of the predictive model selection device of FIG. 1 in accordance with an illustrative embodiment.

FIG. 17 shows a table of illustrative performance values computed by the predictive model selection device of FIG. 1 for the plurality of prediction type models in accordance with an illustrative embodiment.

DETAILED DESCRIPTION

Figure 13:
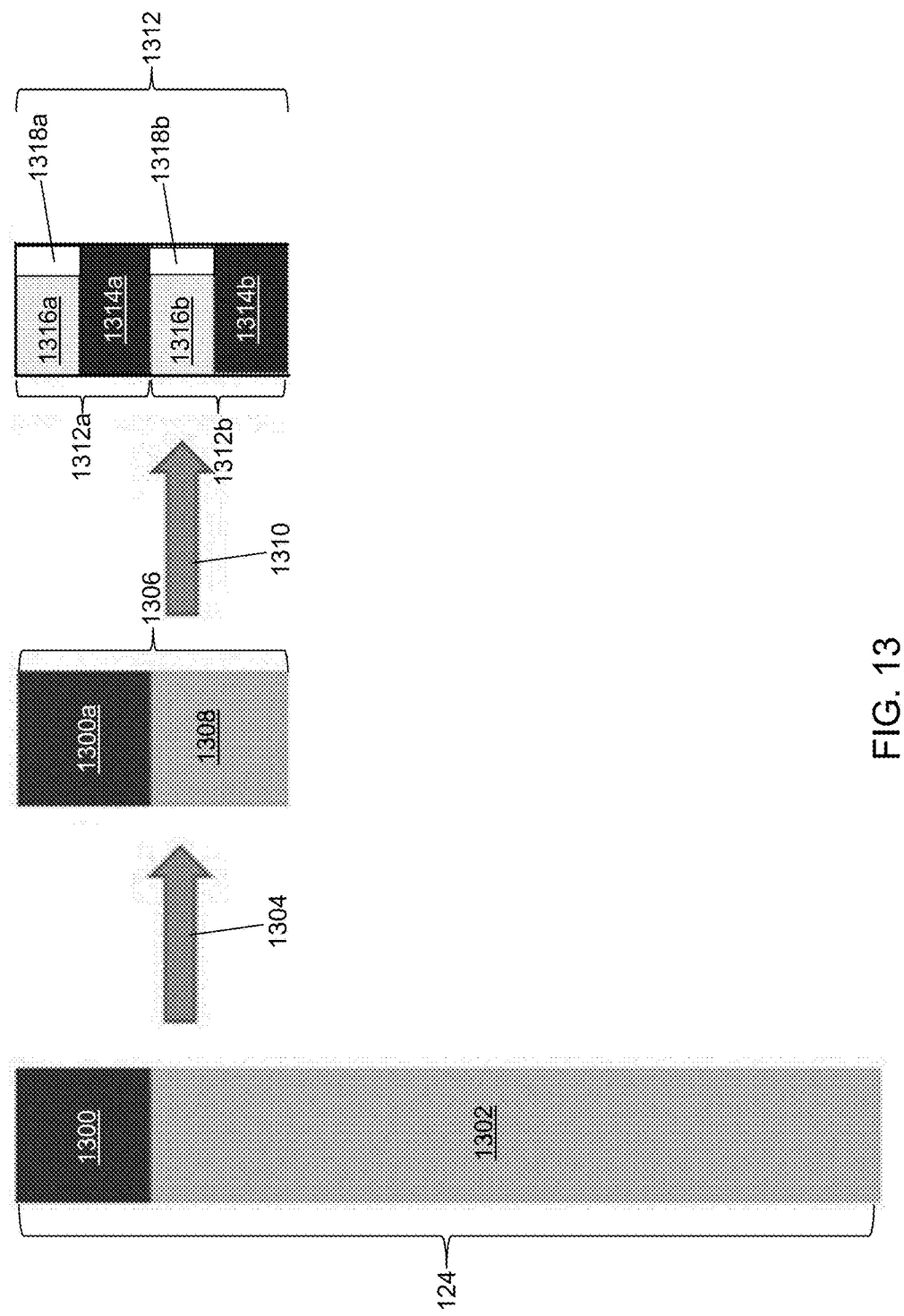
FIG. 13 depicts a flow diagram illustrating examples of operations performed by a traditional predictive model selection device in accordance with an illustrative embodiment.

Referring to FIG. 13, a flow diagram illustrating examples of operations performed on an input dataset 124 by a traditional predictive model selection device are shown in accordance with an illustrative embodiment. During a predictive model selection process, predictive models are fit using training data. Prediction errors for the trained models are computed using validation data to decide when to terminate the selection process and to decide which model to select. After a model has been selected, assessment data can be used to assess how the selected model generalizes on data that played no role in training and selecting the predictive model. For example, an input dataset 124 includes rare events 1300 and non-rare events 1302 that are oversampled in an oversampling process 1304 to create an oversampled training/validation dataset 1306. Oversampled training/validation dataset 1306 includes a first rare events subset 1300a and a first non-rare events subset 1308. Oversampling process 1304 selects first rare events subset 1300a from input dataset 124 based on a percentage of rare events 1300 that may be 100% as illustrated in FIG. 13. Oversampling process 1304 also randomly selects an approximately equal number of observation vectors from non-rare events 1302 to create first non-rare events subset 1308 that has approximately the same number of observation vectors as rare events 1300.

A plurality of train/validate samples 1312 are created in a random sampling process 1310 where each train/validate sample is randomly selected from oversampled training/validation dataset 1306 with replacement of observation vectors for each sample such that each train/validate sample is selected from the entirety of oversampled training/validation dataset 1306. For illustration, the plurality of train/validate samples 1312 includes a first train/validate sample 1312a and a second train/validate sample 1312b. Random sampling process 1310 randomly selects first train/validate sample 1312a and second train/validate sample 1312b without regard to whether the observation vector is included in rare events 1300 or in first non-rare events subset 1308. Once selected, first train/validate sample 1312a is randomly partitioned into a first training sample 1314a and a first validation sample 1316a based on a selection of a ratio or a percentage of first train/validate sample 1312a that is allocated to first validation sample 1316a. After randomly selecting first validation sample 1316a from train/validate sample 1312a based on the selected ratio, a remainder of the observation vectors of first train/validate sample 1312a is allocated to first training sample 1314a. A first assessment sample 1318a is randomly partitioned from first validation sample 1316a for assessment of trained/validated predictive models.

Similarly, once selected, second train/validate sample 1312b is randomly partitioned into a second training sample 1314b and a second validation sample 1316b based on a selection of a ratio or a percentage of second train/validate sample 1312b that is allocated to second validation sample 1316b. After randomly selecting second validation sample 1316b from train/validate sample 1312b based on the selected ratio, a remainder of the observation vectors of second train/validate sample 1312b is allocated to second training sample 1314b. A second assessment sample 1318b is randomly partitioned from second validation sample 1316b for assessment of trained/validated predictive models.

For a binary determination between an event type and a non-event type, the confusion matrix is a 2×2 matrix. The confusion matrix shows the number (count) of correct and incorrect predictions compared to a ground truth based on input dataset 124, which correctly indicates whether or not the event has or has not occurred. For illustration, the confusion matrix is shown below in Table I.

TABLE I

|  |  | Actual Classification | |
|---|---|---|---|
|  |  | Event | Non-Event |
| Predicted Classification | Event | TP | FP |
|  | Non-Event | FN | TN |

"TP" indicates a number of true positives in which the actual classification and the predicted classification accurately indicate occurrence of the event type. "TN" indicates a number of true negatives in which the actual classification and the predicted classification accurately indicate non-occurrence of the event type. "FP" indicates a number of false positives in which the actual classification indicates non-occurrence of the event type and the predicted classification incorrectly indicates occurrence of the event type. "FN" indicates a number of false negatives in which the actual classification indicates occurrence of the event type and the predicted classification incorrectly indicates non-occurrence of the event type.

Figure 14:
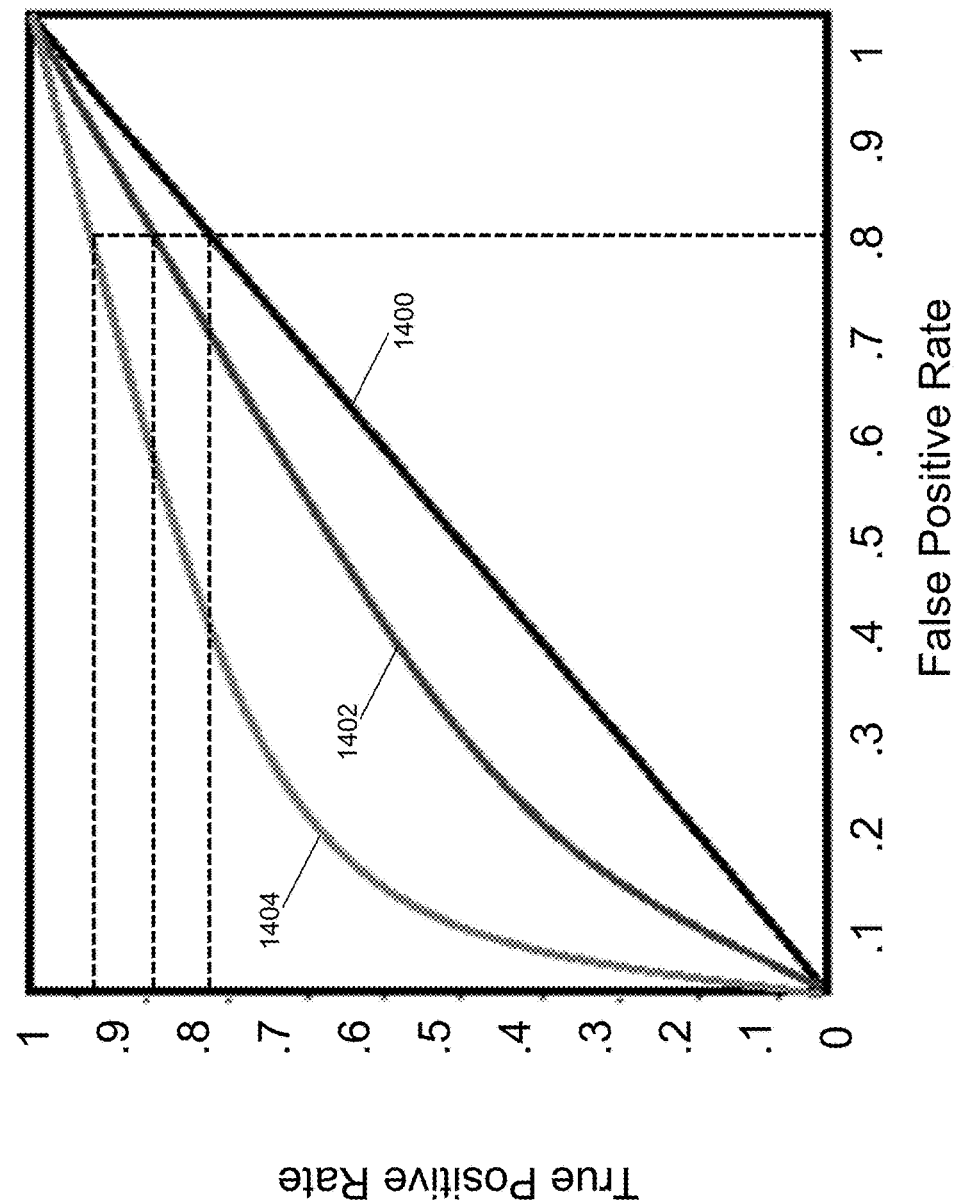
FIG. 14 depicts a plurality of receiver operating curves that result from different trained predictive models in accordance with an illustrative embodiment.

Receiver operating curves (ROCs) are frequently used to show a trade-off between sensitivity and specificity for every possible event decision threshold value in a graphical way. For illustration, referring to FIG. 14, a plurality of receiver operating curves that result from different trained predictive models are shown in accordance with an illustrative embodiment. The plurality of receiver operating curves includes a first predictive model curve 1400, a second predictive model curve 1402, and a third predictive model curve 1404. For illustration, selection of an event decision threshold value equal to 0.8 to reduce a number of false positives, results in an ~0.95 true positive rate using a third predictive model used to define third predictive model curve 1404; whereas, the event decision threshold value equal to 0.8 results in an ~0.89 true positive rate using a second predictive model used to define second predictive model curve 1402; whereas, the event decision threshold value equal to 0.8 results in an ~0.82 true positive rate using a first predictive model used to define first predictive model curve 1400. Thus, the third predictive model performs better than the first predictive model and better than the second predictive model, and the second predictive model performs better than the first predictive model.

Various measures can be used to assess the trained and validated predictive model's performance using the assessment sample. An area under a ROC (AUC) is measured by the area under the ROC curve. An area of 1 represents a perfect predictive model while an area of 0.5 represents a completely random predictive model. For example, the AUC of the first predictive model indicates the first predictive model completely random predictive model. The AUC of the third predictive model also indicates that it is a better predictive model than the first predictive model and the second predictive model.

The accuracy is also defined as a proportion of the total number of predictions that are correct and can be computed using the equation (TP+TN)/(TP+TN+FP+FN). A misclassification rate is defined as one minus the accuracy value and can be computed using the equation (FP+FN)/(TP+TN+FP+FN). A sensitivity (also called recall, the true positive rate, or the probability of detection) is defined as the proportion of positive cases that are correctly identified and can be computed using the equation TP/(TP+FN). A specificity (also called the true negative rate or negative predictive value) is defined as the proportion of negative cases that are correctly identified and can be computed using the equation TN/(TN+FP). An F-score ($F_1$ score or an F-measure) can be computed using the equation $$F_{score} = 2 * \frac{precision * sensitivity}{precision + sensitivity}$$

where the precision can be computed using the equation TP/(TP+FP). F-score is a harmonic mean of the precision and the recall.

For example, given TP=80, FP=120, FN=20, and TN=180, results in the accuracy value equal to (80+180)/(80+180+20+120)=0.65, the misclassification rate value equal to 1−0.65=0.35, the sensitivity value equal to 80/(80+20)=0.8, the specificity value equal to 180/(180+120)=0.6, the precision equal to 80/(80+120)=0.4, and the F-score equal to 2*0.4*0.8/(0.4+0.8)=0.533.

A lift value is also widely used to assess predictive model performance. Lift is defined as a ratio between the results obtained using the predictive model and the results obtained without using the predictive model. A cumulative lift chart is a visual aid for evaluating models, the greater the area between the cumulative lift curve and the baseline curve, the better the predictive model performs.

These assessment statistics are based on the count of occurrences of TP, TN, FP, FN, with each occurrence equally weighted despite the fact that a FN may be more "costly" than a FP or vice versa or a TP may be much more valuable that a FP. Because of this, the predictive model selected to perform best may not actually perform best when these factors are considered.

Figure 1:
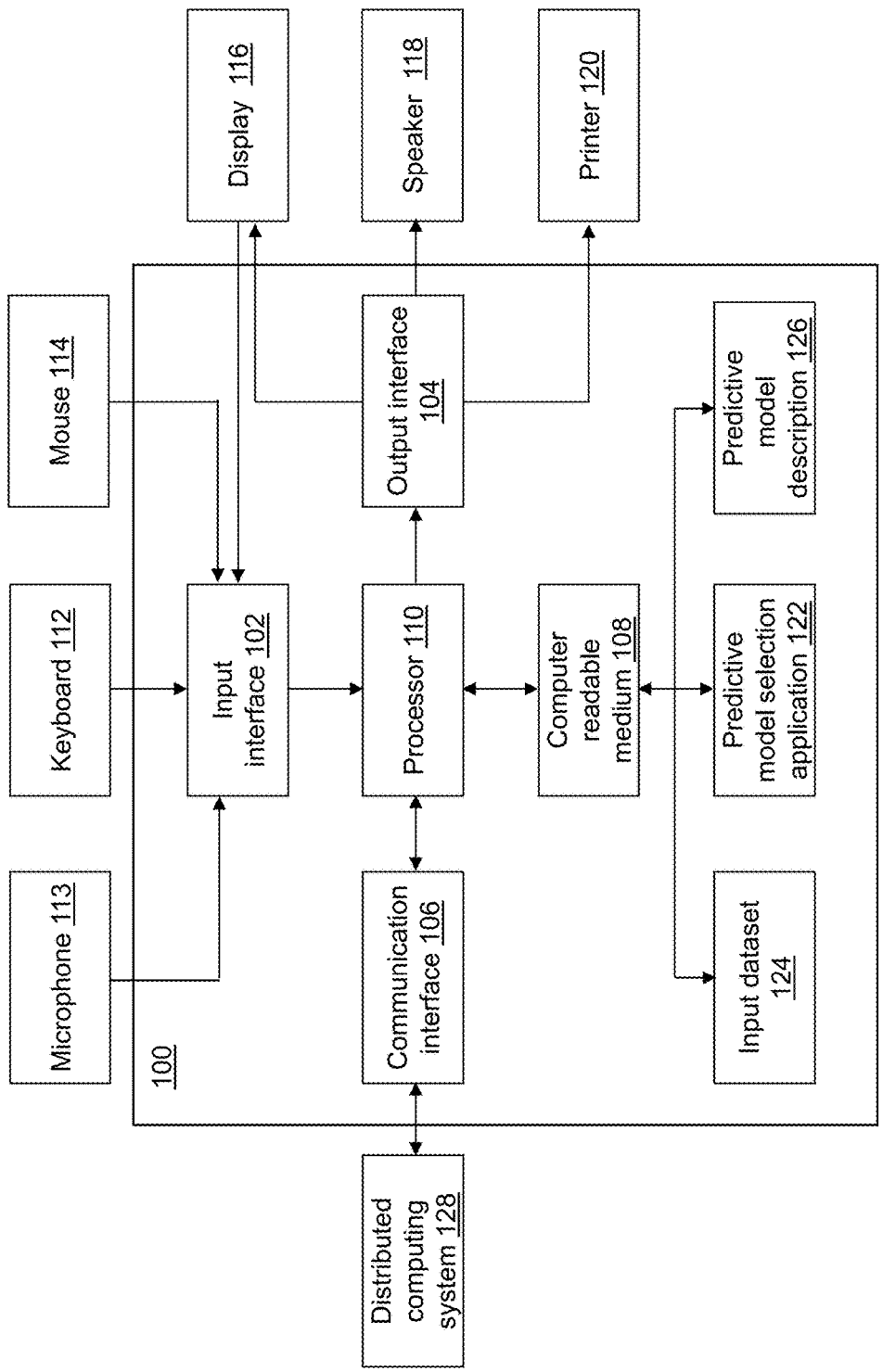
FIG. 1 depicts a block diagram of a predictive model selection device in accordance with an illustrative embodiment.

Referring to FIG. 1, a block diagram of a predictive model selection device 100 is shown in accordance with an illustrative embodiment that solves the problems discussed above using traditional predictive model selection devices. Predictive model selection device 100 provides predictive model selection that may performed in a single machine batch mode, in a distributed batch mode on a cluster of machines such as a distributed computing system 128 that distribute an input dataset 124 and/or the computations on one or more computing devices, or in a streaming mode in which training data is received in an event stream by predictive model selection device 100 that is executing an event stream processing engine (ESPE). Predictive model selection device 100 may include an input interface 102, an output interface 104, a communication interface 106, a non-transitory computer-readable medium 108, a processor 110, a predictive model selection application 122, input dataset 124, and a predictive model description 126. Fewer, different, and/or additional components may be incorporated into predictive model selection device 100.

Input interface 102 provides an interface for receiving information from the user or another device for entry into predictive model selection device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into predictive model selection device 100 or to make selections presented in a user interface displayed on display 116.

The same interface may support both input interface 102 and output interface 104. For example, display 116 comprising a touch screen provides a mechanism for user input and for presentation of output to the user. Predictive model selection device 100 may have one or more input interfaces that use the same or a different input interface technology. The input interface technology further may be accessible by predictive model selection device 100 through communication interface 106.

Output interface 104 provides an interface for outputting information for review by a user of predictive model selection device 100 and/or for use by another application or device. For example, output interface 104 may interface with various output technologies including, but not limited to, display 116, a speaker 118, a printer 120, etc. Predictive model selection device 100 may have one or more output interfaces that use the same or a different output interface technology. The output interface technology further may be accessible by predictive model selection device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Predictive model selection device 100 may have one or more communication interfaces that use the same or a different communication interface technology. For example, predictive model selection device 100 may support communication using an Ethernet port, a Bluetooth antenna, a telephone jack, a USB port, etc. Data and/or messages may be transferred between predictive model selection device 100 and another computing device of distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Predictive model selection device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Predictive model selection device 100 also may have one or more drives that support the loading of a memory media such as a CD, DVD, an external hard drive, etc. One or more external hard drives further may be connected to predictive model selection device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Predictive model selection device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Predictive model selection application 122 performs operations associated with defining predictive model description 126 from data stored in input dataset 124. Predictive model description 126 may be used to predict a response variable value for data stored in a new dataset 324 (shown referring to FIG. 3) or streamed to a prediction device 300 (shown referring to FIG. 3). Some or all of the operations described herein may be embodied in predictive model selection application 122. The operations may be implemented using hardware, firmware, software, or any combination of these methods.

Referring to the example embodiment of FIG. 1, predictive model selection application 122 is implemented in software (comprised of computer-readable and/or computer-executable instructions) stored in computer-readable medium 108 and accessible by processor 110 for execution of the instructions that embody the operations of predictive model selection application 122. Predictive model selection application 122 may be written using one or more programming languages, assembly languages, scripting languages, etc. Predictive model selection application 122 may be integrated with other analytic tools. As an example, predictive model selection application 122 may be part of an integrated data analytics software application and/or software architecture such as that offered by SAS Institute Inc. of Cary, N.C., USA. Merely for illustration, predictive model selection application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Fraud Framework, SAS® Visual Investigator, SAS® VDMML, SAS® Model Studio all of which are developed and provided by SAS Institute Inc. of Cary, N.C., USA. Data mining, statistical analytics, and response prediction are applicable in a wide variety of industries to solve technical problems.

Predictive model selection application 122 may be implemented as a Web application. For example, predictive model selection application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records (observations), and the columns may be referred to as variables. In an alternative embodiment, input dataset 124 may be transposed. The plurality of variables may include a response variable Y and one or more explanatory variables that define an explanatory vector X for each observation vector. Input dataset 124 may include additional variables that are not the response variable Y or one of the explanatory variables. An observation vector is defined as $(y_i, x_i)$ that may include a value for each of the response variable Y and the explanatory variables associated with the observation vector i. One or more variables of the plurality of variables may describe a characteristic of a physical object. For example, if input dataset 124 includes data related to operation of a vehicle, the variables may include a type of vehicle, an oil pressure, a speed, a gear indicator, a gas tank level, a tire pressure for each tire, an engine temperature, a radiator level, etc. Input dataset 124 may include data captured as a function of time for one or more physical objects.

The data stored in input dataset 124 may be generated by and/or captured from a variety of sources including one or more sensors of the same or different type, one or more computing devices, etc. The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

In data science, engineering, and statistical applications, data often consists of multiple measurements (across sensors, characteristics, responses, etc.) collected across multiple time instances (patients, test subjects, etc.). These measurements may be collected in input dataset 124 for analysis and processing or streamed to predictive model selection device 100 as it is generated.

Input dataset 124 may be stored on computer-readable medium 108 or on one or more computer-readable media of distributed computing system 128 and accessed by predictive model selection device 100 using communication interface 106, input interface 102, and/or output interface 104. Data stored in input dataset 124 may be sensor measurements or signal values captured by a sensor, may be generated or captured in response to occurrence of an event or a transaction, generated by a device such as in response to an interaction by a user with the device, etc. The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 124 may be captured at different time points periodically, intermittently, when an event occurs, etc. One or more columns of input dataset 124 may include a time and/or date value.

Input dataset 124 may include data captured under normal and abnormal operating conditions of the physical object. Input dataset 124 may include data captured at a high data rate such as 200 or more observation vectors per second for one or more physical objects. For example, data stored in input dataset 124 may be generated as part of the Internet of Things (IoT), where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

Input dataset 124 may be stored using various data structures as known to those skilled in the art including one or more files of a file system, a relational database, one or more tables of a system of tables, a structured query language database, etc. on predictive model selection device 100 or on distributed computing system 128. Predictive model selection device 100 may coordinate access to input dataset 124 that is distributed across distributed computing system 128 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SAS® Viya™ open, cloud-ready, in-memory architecture also may be used as an analytic platform to enable multiple users to concurrently access data stored in input dataset 124. SAS® Cloud Analytic Services (CAS) may be used as an analytic server with associated cloud services in SAS® Viya™. Some systems may use SAS In-Memory Statistics for Hadoop® to read big data once and analyze it several times by persisting it in-memory for the entire session. Some systems may be of other types and configurations.

A predictive model predicts a value of Y given an explanatory variable X. For illustration, a predictive model can be defined using the HPSVM procedure implemented by SAS® Enterprise Miner™ software, the SVMACHINE procedure implemented by SAS® Visual Data Mining and Machine Learning software, the FACTMAC procedure implemented by SAS® Visual Data Mining and Machine Learning software, the FOREST procedure implemented by SAS® Visual Data Mining and Machine Learning software, the GRADBOOST procedure implemented by SAS® Visual Data Mining and Machine Learning software, the SVMACHINE procedure implemented by SAS® Visual Data Mining and Machine Learning software, the NNET procedure implemented by SAS® Visual Data Mining and Machine Learning software, etc.

Figure 2B:
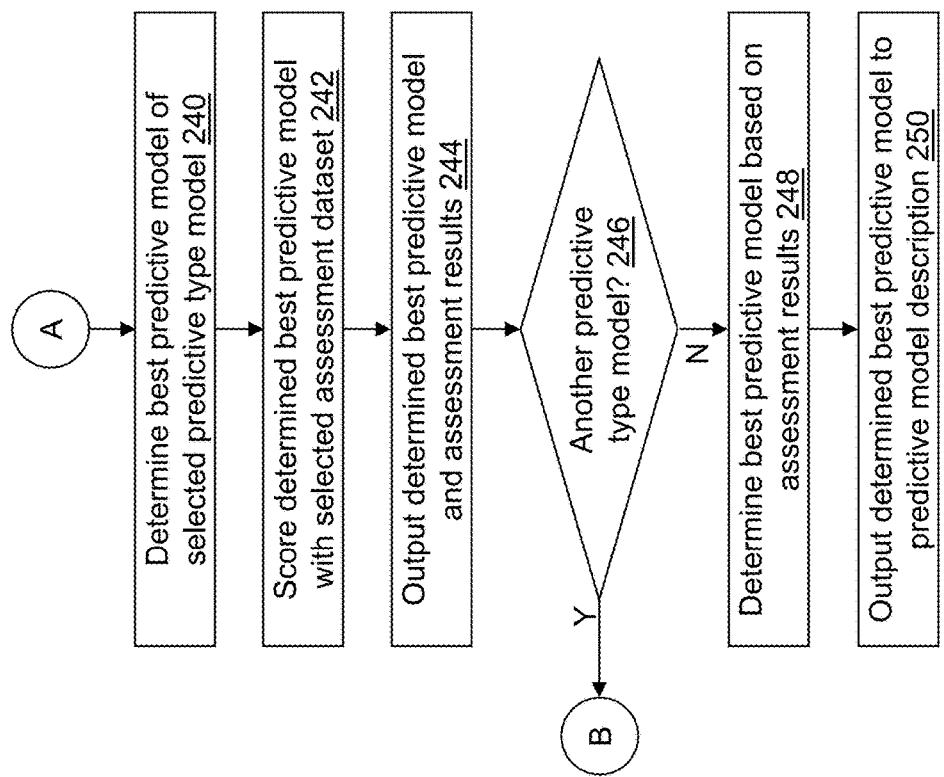
Figure 2C:
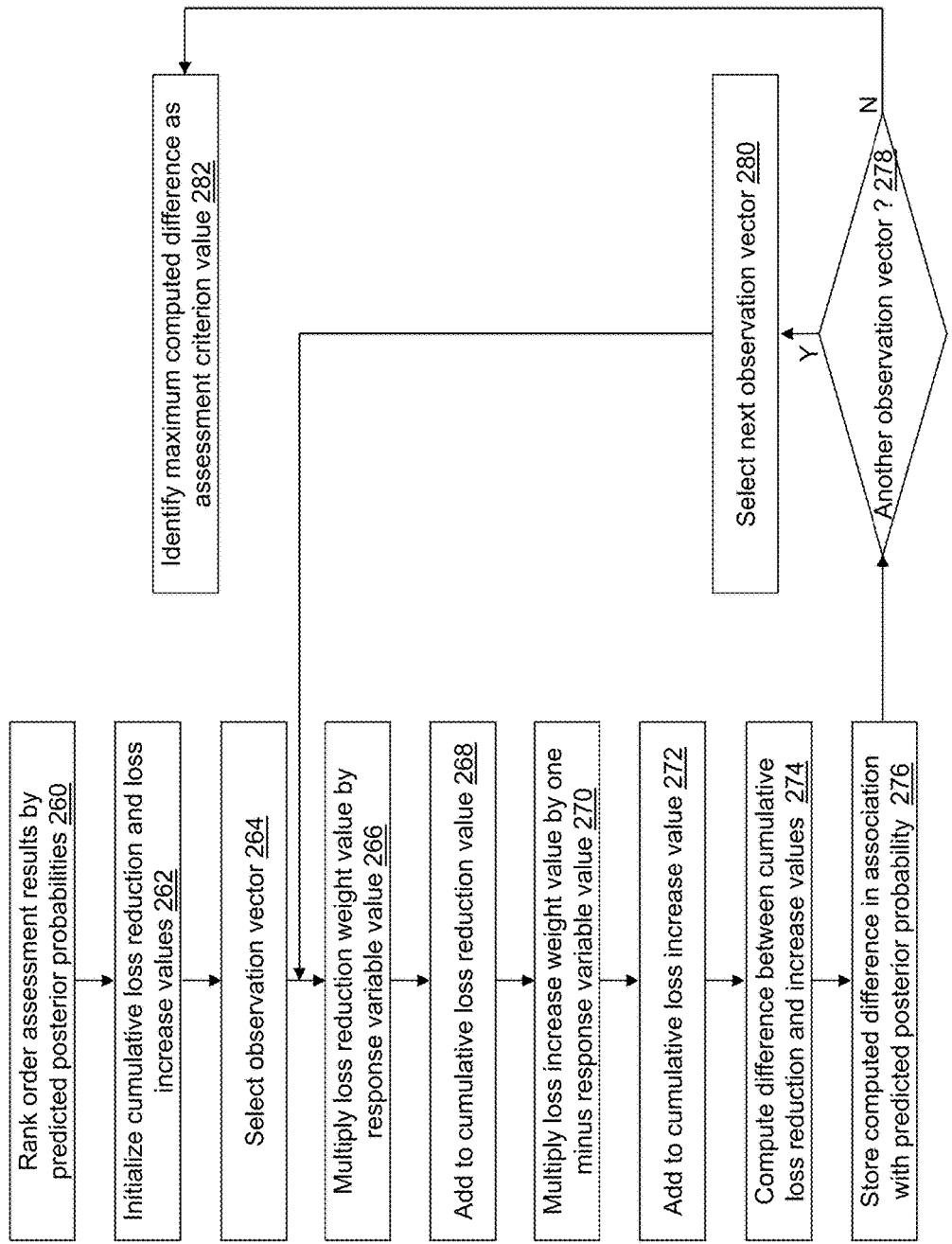

Referring to FIGS. 2A to 2C, example operations associated with predictive model selection application 122 are described. Additional, fewer, or different operations may be performed depending on the embodiment of predictive model selection application 122. The order of presentation of the operations of FIGS. 2A to 2C is not intended to be limiting. Some of the operations may not be performed in some embodiments. Although some of the operational flows are presented in sequence, the various operations may be performed in various repetitions, concurrently (in parallel, for example, using threads and/or distributed computing system 128), and/or in other orders than those that are illustrated. For example, a user may execute predictive model selection application 122, which causes presentation of a first user interface window, which may include a plurality of menus and selectors such as drop-down menus, buttons, text boxes, hyperlinks, etc. associated with predictive model selection application 122 as understood by a person of skill in the art. The plurality of menus and selectors may be accessed in various orders. An indicator may indicate one or more user trainings from a user interface, one or more data entries into a data field of the user interface, one or more data items read from computer-readable medium 108 or otherwise defined with one or more default values, etc. that are received as an input by predictive model selection application 122.

Referring to FIG. 2A, in an operation 200, a first indicator may be received that indicates input dataset 124. For example, the first indicator indicates a location and a name of input dataset 124. As an example, the first indicator may be received by predictive model selection application 122 after selection from a user interface window or after entry by a user into a user interface window. In an alternative embodiment, input dataset 124 may not be selectable. For example, a most recently created dataset may be used automatically.

In an operation 202, a second indicator may be received that indicates response variable Y in input dataset 124. For example, the second indicator may indicate a column number or a column name. As another option, a first or a last column of input dataset 124 may be assumed to be the response variable Y column.

In an operation 204, a third indicator may be received that indicates one or more explanatory variables X in input dataset 124. For example, the third indicator may indicate one or more column numbers or one or more column names. As another option, a first or a last column of input dataset 124 may be assumed to be the explanatory variable X column. As understood by a person of skill in the art, when the third indicator indicates a plurality of explanatory variables, X defines an explanatory variable vector.

In an operation 206, a fourth indicator may be received that indicates a value variable in input dataset 124. For example, the fourth indicator may indicate a column number or a name for the value variable. In an alternative embodiment, instead of indicating a value variable a single value v may be indicated by the fourth indicator. In an alternative embodiment, the fourth indicator may not be received. For example, a default value for v may be stored, for example, in computer-readable medium 108 and used automatically. In another alternative embodiment, the value of v may not be selectable. Instead, a fixed, predefined value may be used.

In an operation 208, a fifth indicator may be received that indicates a cost variable in input dataset 124. For example, the fifth indicator may indicate a column number or a name for the cost variable. In an alternative embodiment, instead of indicating a cost variable a single cost value c may be indicated by the fifth indicator. In an alternative embodiment, the fifth indicator may not be received. For example, a default value for c may be stored, for example, in computer-readable medium 108 and used automatically. In another alternative embodiment, the value of c may not be selectable. Instead, a fixed, predefined value may be used.

In an operation 210, a sixth indicator of a value of an event assessment variable indicator and a value of an event assessment sample size $N_A$ may be received. For example, the sixth indicator may indicate a column number or a column name as the event assessment variable indicator. In an alternative embodiment, the event assessment variable indicator and/or the event assessment sample size $N_A$ may not be received or may not be selectable. For example, the event assessment variable indicator may be the response variable Y in input dataset 124 by default or automatically without a selection. For example, a default value may be stored, for example, in computer-readable medium 108 for the event assessment sample size $N_A$ and used automatically or by default. In an alternative embodiment, the event assessment sample size $N_A$ may be defined as a percentage of the number of observation vectors included in input dataset 124.

In an operation 212, a seventh indicator of a value of an event indicator and a value of an event sample size $N_{TV}$ for training and validating may be received. In an alternative embodiment, the seventh indicator may not be received. For example, a default value may be stored, for example, in computer-readable medium 108 and used automatically for the value of the event indicator and the value of the event sample size $N_{TV}$ for training and validating. For illustration, the default value for the event indicator may be one. In another alternative embodiment, the value of the event indicator and the value of the event sample size $N_{TV}$ for training and validating may not be selectable. Instead, fixed, predefined values may be used. In an alternative embodiment, the event sample size $N_{TV}$ for training and validating may be defined as a percentage of the number of observation vectors included in a training/validating dataset selected from input dataset 124.

In an operation 214, an eighth indicator of a value of a validation sample size $N_V$ may be received. In an alternative embodiment, the eighth indicator may not be received. For example, a default value may be stored, for example, in computer-readable medium 108 and used automatically. In another alternative embodiment, the value of the validation sample size $N_V$ may not be selectable. Instead, a fixed, predefined value may be used. In an alternative embodiment, the validation sample size $N_V$ may be defined as a percentage of the number of observation vectors included in a training/validating dataset selected from input dataset 124.

In an operation 216, a ninth indicator of a value of a number of train/validate cycles k for cross validation may be received. In an alternative embodiment, the ninth indicator may not be received. For example, a default value may be stored, for example, in computer-readable medium 108 and used automatically. For illustration, a default value may be the number of train/validate cycles k=1 such that cross validation is not performed. In another alternative embodiment, the value of the number of train/validate cycles may not be selectable. Instead, a fixed, predefined value may be used. In cross validation, each predictive model validation requires k−1 number of training and validation executions with k−1 different training subsets selected from the training/validating dataset and with the remainder of the observation vectors included in a validation subset. Cross validation provides on average a better representation of error across input dataset 124.

In an operation 218, a tenth indicator of a plurality of predictive type models may be received. A champion predictive model is determined by training and validating a model of each predictive type model of the plurality of predictive type models where a predictive type model may be listed zero or more times. The tenth indicator may be received by predictive model selection application 122 after selection from a user interface window or after entry by a user into a user interface window. As an example, each predictive type model in a list of predictive type models may include an indicator of a "Decision Tree", a "Factorization Machine", a "Forest", a "Gradient Boosting Tree", a "Neural Network", a "Support Vector Machine", etc. Of course, the predictive type model may be labeled or selected in a variety of different manners by the user as understood by a person of skill in the art. In an alternative embodiment, the predictive type model may not be selectable, and each of a plurality of predefined predictive type models is implemented in predictive model selection application 122.

In an operation 220, an eleventh indicator may include specified values for one or more of the hyperparameters and/or specified values for an automatic tuning method (autotune option) associated with each of the plurality of predictive type models. Hyperparameters define values or various options that govern a training process based on the predictive type model. The default values of these hyperparameters may not be suitable for all applications. To reduce the effort in adjusting these hyperparameters, an automatic tuning process may be used to identify the best settings for the hyperparameters though the hyperparameters may optionally be selected as an input option by a user. An optimization algorithm (tuner) searches for the best possible combination of values of the hyperparameters while trying to minimize an objective function. The objective function is a validation error estimate (e.g., misclassification error for nominal targets or average square error for interval targets). The tuning process includes multiple iterations with each iteration typically involving multiple objective function evaluations.

The decision tree predictive type model builds tree-based statistical models for classification and regression. For example, a TREESPLIT Procedure included in SAS® Visual Data Mining and Machine Learning 8.1: Statistical Procedures developed and provided by SAS Institute Inc. of Cary, N.C., USA may be used with an AUTOTUNE Statement or by specifying the one or more hyperparameters using the tenth indicator or by using default values. For illustration, the decision tree predictive type model hyperparameters may include a maximum number of decision tree levels (depth), a maximum number of child nodes for each parent node, a minimum number of observation vectors in each child node, a number of bins to use for numeric variables during calculation of the decision tree, a number of surrogate rules to create for each splitting rule, a criterion by which to split a parent node into child nodes, a pruning method, etc.

When the autotune option is selected for creating the decision tree predictive type model, for example using the AUTOTUNE Statement, the decision tree predictive type model automatically adjusts decision tree hyperparameters to tune a decision tree model for minimum error as measured by a specified objective function. One or more values of a maximum number of decision tree levels, one or more values of a number of bins to use for numeric variables during calculation of the decision tree, one or more values of a split criterion for each tree node, etc. may be specified as options. For illustration, a tuneDecisionTree action selects different hyperparameter configurations to run a dtreeTrain action, optionally a dtreePrune action, and a dtreeScore action multiple times to train and validate a decision tree model as it searches for a model that has reduced validation error. For illustration, the tuneDecisionTree action, the dtreeTrain action, the dtreePrune action, and the dtreeScore action are included in SAS® Viya™ and SAS® Cloud Analytic Services (CAS) developed and provided by SAS Institute Inc. of Cary, N.C., USA.

The factorization machine predictive type model estimates factors for each nominal variable type of the one or more explanatory variables X, in addition to estimating a global bias and a bias for each level of the nominal variables. The biases and factors may be computed using a stochastic gradient descent (SGD) algorithm that minimizes a root mean square error (RMSE) criterion. Each iteration attempts to reduce the RMSE. The SGD algorithm proceeds until the maximum number of iterations is reached. For illustration, a FACTMAC procedure included in SAS® Visual Data Mining and Machine Learning 8.1: Data Mining and Machine Learning Procedures developed and provided by SAS Institute Inc. of Cary, N.C., USA may be used with an AUTOTUNE Statement or by specifying the one or more hyperparameters using the tenth indicator or by using default values. For illustration, the factorization machine predictive type model hyperparameters may include a number of factors, a learning step size, a maximum number of iterations, etc.

When the autotune option is selected for creating the factorization machine predictive type model, for example using the AUTOTUNE Statement, the factorization machine predictive type model automatically adjusts factorization machine hyperparameters to tune a factorization machine model for minimum error as measured by a specified objective function. One or more values of the number of factors, one or more values of the learning step size, one or more values of the maximum number of iterations, etc. may be specified. A tuneFactmac action selects different hyperparameter configurations to run the factmac action of the factmac action set, the score action of the astore action set, and the assess action of the percentile action set to train and validate factorization machine models as it searches for a model that has reduced validation error. For illustration, the factmac action, the score action, and the assess action are included in SAS® Viya™ and SAS® Cloud Analytic Services (CAS) developed and provided by SAS Institute Inc. of Cary, N.C., USA.

The forest predictive type model creates a predictive model called a forest that includes several decision trees. For illustration, a FOREST procedure included in SAS® Visual Data Mining and Machine Learning 8.1: Data Mining and Machine Learning Procedures developed and provided by SAS Institute Inc. of Cary, N.C., USA may be used with an AUTOTUNE Statement or by specifying the one or more hyperparameters using the tenth indicator or by using default values. The FOREST procedure creates multiple decision trees that differ from each other in two ways: 1) the training data for each tree constitutes a different sample, and each sample is created by sampling, with replacement, observations from the original training data of the forest, and 2) the input variables that are considered for splitting a node are randomly selected from the one or more explanatory variables X. Among these randomly selected variables, the FOREST procedure chooses a single variable, which is associated the most with the response variable Y when it forms a splitting rule. The FOREST procedure creates an ensemble of decision trees to predict a single response variable of either interval or nominal measurement level. An input variable can have an interval or nominal measurement level.

The forest predictive type model creates a decision tree recursively by choosing an input variable and using it to create a rule to split the data into two or more subsets. The process is repeated in each subset, and again in each new subset, and so on until a constraint is met. In the terminology of the tree metaphor, the subsets are nodes, the original data table is a root node, and final unpartitioned subsets are leaves or terminal nodes. A node is an internal node if it is not a leaf. The data in a leaf determine estimates of the value of the response variable. These estimates are subsequently applied to predict the response variable of a new observation that is assigned to the leaf. The forest predictive type model hyperparameters may include a fraction of a random bootstrap sample of the training data to be used for growing each tree in the forest, a maximum depth of a decision tree to be grown where a number of levels in a tree is equal to a depth value plus one, a number of trees to grow, a number of input variables to consider splitting on in a node, a maximum number of splits per node, a minimum number of observation vectors per leaf, etc.

When the autotune option is selected for creating the forest predictive type model, for example using the AUTOTUNE Statement, the forest predictive type model automatically adjusts forest hyperparameters to tune a forest model for minimum error as measured by a specified objective function. One or more values of the fraction of the training data to use for each bagged tree, one or more values of the maximum depth of a decision tree to be grown, one or more values of the number of trees to grow, one or more values of the number of input variables to consider splitting on in a node, etc. may be specified. For illustration, a tuneForest action selects different hyperparameter configurations to run a forestTrain action and a forestScore action multiple times to train and validate the forest model as it searches for a model that has reduced validation error. For illustration, the tuneForest action, the forestTrain action, and the forestScore action are included in SAS® Viya™ and SAS® Cloud Analytic Services (CAS) developed and provided by SAS Institute Inc. of Cary, N.C., USA.

The gradient boosting tree predictive type model creates a predictive model that consists of multiple decision trees. For illustration, a GRADBOOST procedure included in SAS® Visual Data Mining and Machine Learning 8.1: Data Mining and Machine Learning Procedures developed and provided by SAS Institute Inc. of Cary, N.C., USA may be used with an AUTOTUNE Statement or by specifying the one or more hyperparameters using the tenth indicator or by using default values. The gradient boosting tree predictive type model hyperparameters may include an L1 norm regularization parameter, a learning rate for each tree, a number of trees to grow, an L2 norm regularization parameter, a fraction of the training data to be used for growing each tree, a number of input variables to consider splitting on in a node where the value, a maximum number of splits per node, a maximum tree depth, a minimum number of observation vectors per leaf, etc.

When the autotune option is selected for creating the forest predictive type model, for example using the AUTOTUNE Statement, the gradient boosting tree predictive type model automatically adjusts gradient boosting tree parameters to tune a gradient boosting tree model that includes multiple decision trees for minimum error as measured by a specified objective function. One or more values of the L1 norm regularization parameter, one or more values of the learning rate for each tree, one or more values of the number of trees to grow, one or more values of the L2 norm regularization parameter, one or more values of the fraction of the training data to be used for growing each tree, one or more values of the number of input variables to consider splitting on in a node where the value, etc. may be specified. A tuneGradientBoostTree action selects different hyperparameter configurations to run the gbtreeTrain and gbtreeScore actions multiple times to train and validate gradient boosting tree models as it searches for a model that has reduced validation error. For illustration, the gbtreeTrain and gbtreeScore actions are included in the decisionTree action set of SAS® Viya™ and SAS® Cloud Analytic Services (CAS) developed and provided by SAS Institute Inc. of Cary, N.C., USA.

The neural network predictive type model trains a multilayer perceptron neural network. Training a multilayer perceptron neural network relies on an unconstrained minimization of a nonlinear objective function. For illustration, a NNET procedure included in SAS® Visual Data Mining and Machine Learning 8.1: Data Mining and Machine Learning Procedures developed and provided by SAS Institute Inc. of Cary, N.C., USA may be used with an AUTOTUNE Statement or by specifying the one or more hyperparameters using the tenth indicator or by using default values. The neural network predictive type model hyperparameters may include an architecture type, a number of hidden layers, a number of neurons in each hidden layer, an activation function for each hidden layer, a combination function for each hidden layer, an optimization algorithm, parameters associated with the selected optimization algorithm, a range of an annealing rate to use when a SGD optimization algorithm is used, a learning rate when the SGD optimization algorithm is used, a mini batch size when the SGD optimization algorithm is used, an L1 norm regularization parameter, an L2 norm regularization parameter, etc.

When the autotune option is selected for creating the neural network predictive type model, for example using the AUTOTUNE Statement, the neural network predictive type model automatically adjusts neural network parameters to tune a neural network model for minimum error as measured by a specified objective function. The neural network predictive type model hyperparameters may include one or more values of the number of hidden layers in the network, one or more values of the number of neurons in each hidden layer, one or more values of the annealing rate to use when a SGD optimization algorithm is used, one or more values of the learning rate when the SGD optimization algorithm is used, one or more values of the L1 norm regularization parameter, one or more values of the L2 norm regularization parameter, etc. For illustration, a tuneNeuralNet action selects different hyperparameter configurations to run the annTrain and annScore actions multiple times to train and validate neural network models as it searches for a model that has reduced validation error. For illustration, the annTrain and annScore actions are included in the neuralNet action set of SAS® Viya™ and SAS® Cloud Analytic Services (CAS) developed and provided by SAS Institute Inc. of Cary, N.C., USA.

The support vector machine predictive type model computes support vector machine learning classifiers. For illustration, a SVMACHINE procedure included in SAS® Visual Data Mining and Machine Learning 8.1: Data Mining and Machine Learning Procedures developed and provided by SAS Institute Inc. of Cary, N.C., USA may be used with an AUTOTUNE Statement or by specifying the one or more hyperparameters using the tenth indicator or by using default values. The support vector machine predictive type model hyperparameters may include a penalty value, a degree value, etc. For illustration, a degree value equal to one indicates use of a linear kernel. A degree value greater than one indicates use of a polynomial kernel.

When the autotune option is selected for creating the neural network predictive type model, for example using the AUTOTUNE Statement, the support vector machine predictive type model automatically adjusts support vector machine parameters to tune a support vector machine model for minimum error as measured by a specified objective function. The support vector machine predictive type model hyperparameters may include one or more values of the penalty value, one or more values of the degree value, etc. For illustration, a tuneSvm action selects different hyperparameter configurations to run the svmTrain action of the svm action set, the score action of the astore action set, and the assess action of the percentile action set to train and validate support vector machine models as it searches for a model that has reduced validation error. For illustration, the svmTrain action is included in the svm action set of SAS® Viya™ and SAS® Cloud Analytic Services (CAS) developed and provided by SAS Institute Inc. of Cary, N.C., USA.

The tenth indicator further may include an indicator of values for one or more optimization parameters used to determine when training/validation of the predictive type model is complete. For example, a maximum number of configuration evaluations, a maximum number of iterations, a maximum time, and/or a maximum number of configurations to evaluate in a single iteration may be defined by the tenth indicator.

The tenth indicator further may include an indicator of an objective function. For example, the tenth indicator indicates a name of an objective function. The objective function specifies a measure of model error as a measure of predictive model performance. A default value for the objective function may further be stored, for example, in computer-readable medium 108. As an example, an objective function may be selected from "ASE", "AUC", "F05", "F1", "GAMMA", "GINI", "KS", "MAE", "MCE", "MCLL", "MISC", "MSE", "MSLE", "RASE", "RMAE", "RMSLE", "TAU", "FLR", etc. Some values can be specified only when the response variable is of a particular type. For example, a default objective function may be the "MISC" objective function for nominal type response variables or "MSE" for interval type response variables. Of course, the objective function may be labeled or selected in a variety of different manners by the user as understood by a person of skill in the art. In an alternative embodiment, the objective function may not be selectable, and a single objective function is implemented in predictive model selection application 122. For example, the "MISC" objective function may be used by default or without allowing a selection for nominal type response variables and "MSE" may be used by default or without allowing a selection for interval type response variables.

ASE uses an average squared error as the objective function; AUC uses an area under a curve as the objective function; F05 uses a F0.5 coefficient as the objective function; F1 uses an F1 coefficient as the objective function; GAMMA uses a gamma coefficient as the objective function; GINI uses a Gini coefficient as the objective function; KS uses a Kolmogorov-Smirnov coefficient as the objective function; MAE uses a mean absolute error as the objective function; MCE uses a misclassification rate as the objective function; MCLL uses a multiclass log loss as the objective function; MISC uses a misclassification error percentage as the objective function; MSE uses a mean squared error as the objective function; MSLE uses a mean squared logarithmic error as the objective function; RASE uses a root average squared error as the objective function; RMAE uses a root mean absolute error as the objective function; RMSLE uses a root mean squared logarithmic error as the objective function; TAU uses a tau coefficient as the objective function; and FLR uses a fraud loss reduction function as the objective function.

The following notation is used to provide a discussion of fit statistics for illustrative objective functions:

$n_o$ is a number of observation vectors, r is a number of levels for a nominal response variable, N is a sum of observation frequencies in the data, $\omega_i$ is a frequency of observation i, so $N=\Sigma_{i=1}^{n_o}\omega_i$, $y_i$ is a response variable value of observation vector i, $\hat{y}_i$ is a predicted response variable value of observation vector i, m is a number of response variable levels, $t_i$ is a level from the response variable in observation vector i, $\hat{t}_i$ is a predicted level from the response variable in observation vector i, $y_{i,j}=1$ if observation i is assigned to response variable level j, otherwise $y_{i,j}=0$, $p_{i,j}$ is a predicted probability that observation i is assigned to response variable level j, $m_{tc}$ is a number of total cutoff points, $a_k$ is a true positive at cutoff point k, $b_k$ is a false positive at cutoff point k, $c_k$ is a false negative at cutoff point k, $\theta=\Sigma_{k=1}^{m_{tc}}(a_{k-1}-a_k)(b_{k-1}-b_k)$, $\mu=\Sigma_{k=2}^{m_{tc}}((a_{k-1}-a_k)\Sigma_{j=1}^{k}(b_{j-1}-b_j))$, $w=\Sigma_{k=1}^{m_{tc}}((a_{k-1}-a_k)\Sigma_{j=k+1}^{m_{tc}}(b_{j-1}-b_j))$, $\rho=a_0 b_0$, $a_{m_{tc}}=0$, $b_{m_{tc}}=0$, $p=a_k/(a_k+b_k)$, $q=a_k/(a_k+c_k)$, and $\beta=0.5$.

For interval response variables, the objective functions may be defined as:

$$ASE = \frac{1}{N}\sum_{i=1}^{n_o}\omega_i(y_i-\hat{y}_i)^2,$$

$$RASE = \sqrt{ASE},$$

$$MSLE = \frac{1}{N} \sum_{i=1}^{n_o} \omega_i (\log(\hat{y}_i + 1) - \log(y_i + 1))^2,$$

$$RMSLE = \sqrt{MSLE},$$

$$MAE = \frac{1}{N} \sum_{i=1}^{n_o} \omega_i |y_i - \hat{y}_i|, \text{ and}$$

$$RMAE = \sqrt{MAE}.$$

For nominal response variables, the objective functions may be defined as:

$$ASE = \frac{1}{rN} \sum_{i=1}^{n_o} \sum_{j=1}^{m} \omega_i (y_{i,j} - p_{i,j})^2,$$

$$RASE = \sqrt{ASE},$$

$$MCE = \frac{1}{N} \sum_{t_i \neq \hat{t}_i} \omega_i, \text{ and}$$

$$MCLL = -\frac{1}{N} \sum_{i=1}^{n_o} \sum_{j=1}^{m} \omega_i y_{i,j} \log p_{i,j}.$$

Additional objective functions may be defined as:

$$AUC = \frac{\mu + \theta/2}{\rho},$$

$$GINI = \frac{\mu - w}{\rho},$$

$$GAMMA = \frac{\mu - w}{\mu + w},$$

$$TAU = \frac{\mu - w}{N/2(N-1)}, \text{ and}$$

$$F05 = \frac{(1 + \beta^2)pq}{\beta^2 p + q}.$$

In an operation 222, a twelfth indicator may be received that indicates an assessment criterion method used to estimate a quality of or a goodness of fit of each predictive model to paired values of the explanatory variable X and the response variable Y using an assessment sample. The assessment sample may be used to select a champion predictive model from the plurality of predictive type models. For example, the eleventh indicator indicates a name of an assessment criterion method. The eleventh indicator may be received by predictive model selection application 122 after training from a user interface window or after entry by a user into a user interface window. A default value for the assessment criterion method may further be stored, for example, in computer-readable medium 108. As an example, an assessment criterion method may be selected from "Value", "AUC", "Misclassification Rate", "F-score", etc. For example, a default assessment criterion method may be indicated by "Value". Of course, the assessment criterion method may be labeled or selected in a variety of different manners by the user as understood by a person of skill in the art. In an alternative embodiment, the assessment criterion method may not be selectable, and a single assessment criterion method is implemented by predictive model selection application 122. For example, the assessment criterion method indicated as "Value" may be used by default. Computation of the "Value" assessment criterion method is described further below.

In an operation 224, an assessment dataset 1502 and a training/validation dataset 1510 are selected from input dataset 124. For illustration, referring to FIG. 15, in a first stratified sampling process 1500, assessment dataset 1502 is randomly selected from rare events 1300 and non-rare events 1302 of input dataset 124. First stratified sampling process 1500 samples rare events 1300 based on the event assessment variable indicated by the event assessment variable indicator (stratum). The value of the event assessment sample size $N_A$ defines a number or a percent of input dataset 124 to include in each of assessment rare events 1504 and assessment non-rare events 1506 so that assessment dataset 1502 has the same distribution as input dataset 124. A rare event may be identified based on an occurrence rate relative to other events. Though various values can be used, an event type is typically classified as a rare event when it occurs less than ~1% of the time. For illustration, the following code illustrates first stratified sampling process 1500 using SAS Studio with SAS Visual Data Mining and Machine Learning with the event assessment variable "class" and the event assessment sample size $N_A$ defined as 20%:

```
proc partition data=cas1.card samppct=20 partind;
  by class;
  output out=cas1.sample_1;
run;
data cas1.data_to_score;
  set cas1.sample_1;
  if_partind_=1;
  drop_partind_;
run;
```

Figure 15:
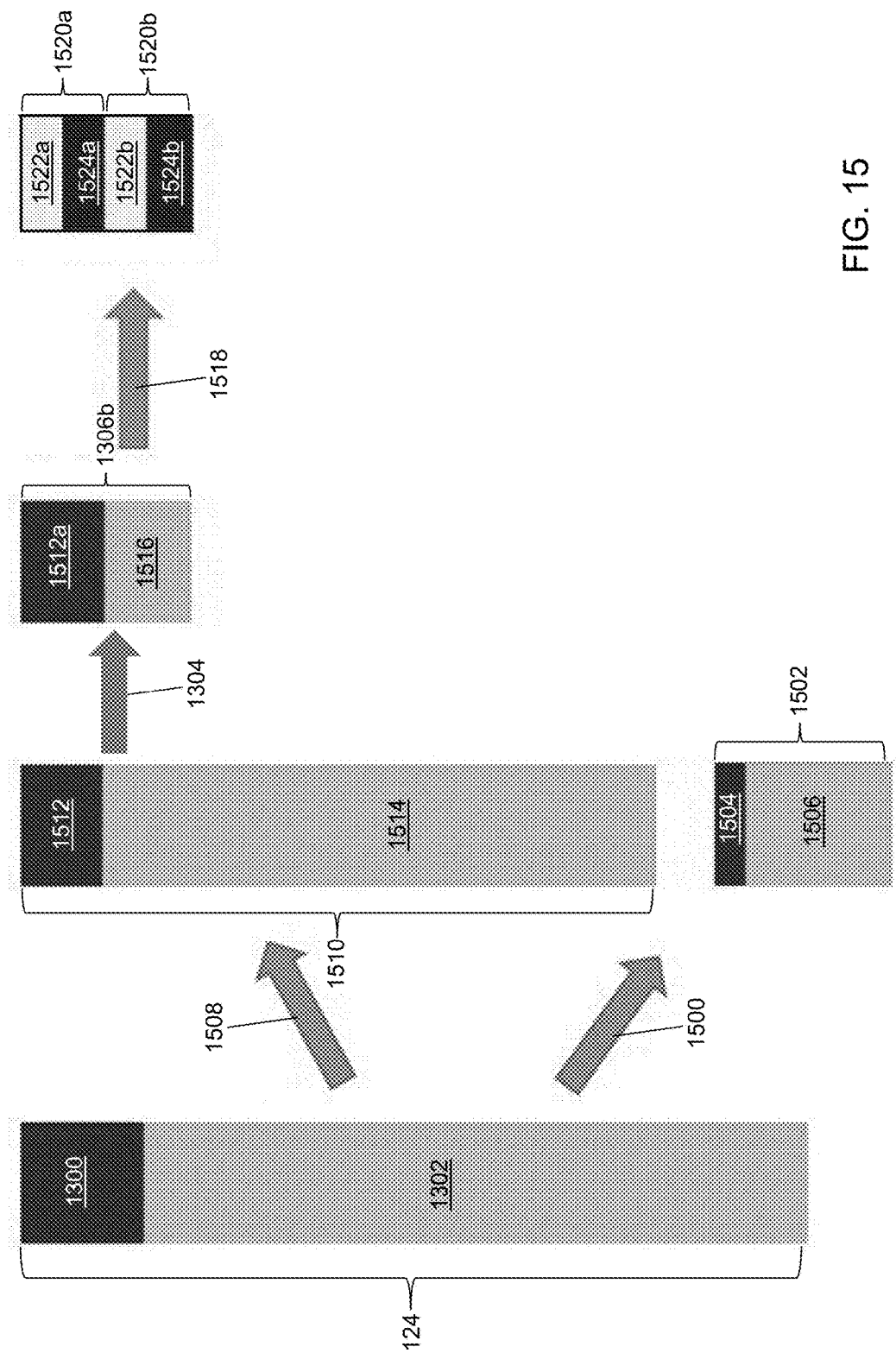
FIG. 15 depicts a flow diagram illustrating examples of operations performed by the predictive model selection device of FIG. 1 in accordance with an illustrative embodiment.

The remainder of input dataset 124 is partitioned into training/validating rare events 1512 and training/validating non-rare events 1514 so that training/validation dataset 1510 has the same distribution as input dataset 124. In oversampling process 1304, a second oversampled training/validation dataset 1306b is randomly selected from training/validation dataset 1510 based on the value of the event indicator and the value of the event sample size $N_{TV}$. Oversampling process 1304 selects second rare events subset 1512a from training/validating rare events 1512 of training/validation dataset 1510 based on the value of the event sample size $N_{TV}$ that may be 100% as illustrated in FIG. 15. Oversampling process 1304 also randomly selects an approximately equal number of observation vectors from training/validating non-rare events 1514 to create second non-rare events subset 1516 that has approximately the same number of observation vectors as second rare events subset 1512a. After oversampling, second oversampled training/validation dataset 1306b is much more balanced. For illustration, the following code illustrates oversampling process 1304 using SAS Studio with SAS Visual Data Mining and Machine Learning with the event indicator "1" for the event assessment variable "class" and with the event sample size $N_{TV}$ defined as 100%:

```
data cas1.data_remaining;
  set cas1.sample_1;
  if_partind_=0;
  drop_partind_;
```

```
run;
proc partition data=cas1.data_remaining event='1' event-
prop=0.4
    sampPctEvt=100;
    by class;
    output out=cas1.oversample;
run;
```
Based on these illustrative selections, "event=1" defines a value for the "class" variable that defines second rare events subset 1512a equal to 100% of training/validating rare events 1512 ("sampPctEvt=100"). Again, second non-rare events subset 1516 has approximately the same number of observation vectors as second rare events subset 1512a.

Referring again to FIG. 2A, in an operation 226, a predictive type model and its associated selections in operation 220 are selected. For example, on a first iteration of operation 226, a first predictive type model is selected from the plurality of predictive type models; on a second iteration of operation 226, a second predictive type model is selected from the plurality of predictive type models, and so on until each predictive type model is selected from the plurality of predictive type models.

In an operation 228, a first training/validating sample 1520a is selected from second oversampled training/validation dataset 1306b in a second stratified sampling process 1518. First training/validating sample 1520a is randomly selected from second rare events subset 1512a and from second non-rare events subset 1516 of second oversampled training/validation dataset 1306b. Second stratified sampling process 1518 samples second rare events subset 1512a based on the event assessment variable indicated by the event assessment variable indicator (stratum). The value of the event assessment sample size $N_A$ defines a number or a percent of second oversampled training/validation dataset 1306b to include in each of first training sample 1522a and first validation sample 1524a so that first training/validating sample 1520a has the same distribution as second oversampled training/validation dataset 1306b. For illustration, the following code illustrates second stratified sampling process 1518 using SAS Studio with SAS Visual Data Mining and Machine Learning with the event assessment variable "class" and the validation sample size $N_V$ defined as 30%:
```
proc partition data=cas1.oversample samppct=30
seed=10 partind
    nthreads=3;
    by class;
    output out=cas1.data_for_model;
run;
```
Thus, 30% of second rare events subset 1512a and 30% of second non-rare events subset 1516 are randomly sampled and included in first validation sample 1524a so that first validation sample 1524a has the same distribution as second oversampled training/validation dataset 1306b. The remainder of second oversampled training/validation dataset 1306b is included in first training sample 1522a. Optionally, on a second iteration of operation 228, 30% of second rare events subset 1512a and 30% of second non-rare events subset 1516 are again randomly sampled and included in a second validation sample 1524b so that second validation sample 1524b has the same distribution as second oversampled training/validation dataset 1306b. The remainder of second oversampled training/validation dataset 1306b is included in second training sample 1522b where second training sample 1522b and second validation sample 1524b define a second training/validating sample 1520b. The random sampling from second oversampled training/validation dataset 1306b is repeated for each iteration of operation 228 until each train/validate cycle has been processed based on the value of the number of train/validate cycles k for cross validation indicated in operation 216.

Referring again to FIG. 2A, in an operation 230, the selected predictive type model is trained using each observation vector read from the selected validation sample (e.g., first training sample 1522a, second training sample 1522b, . . . ) and its associated selections in operation 220.

In an operation 232, the trained predictive model is validated using each observation vector read from the selected validation sample (e.g., first validation sample 1524a, second validation sample 1524b, . . . ), and a validation criterion value or values is computed based on the objective function selected in operation 220.

For illustration, the following code illustrates training and validating of a decision tree predictive type model using the TREESPLIT procedure of SAS Visual Data Mining and Machine Learning 8.1: Statistical Procedures:
```
proc treesplit data=&data_for_model;
    target &target/level=nominal;
    input &interval_list/level=interval;
    partition role=_partind_(validate='1');
    code file="/opt/sasinside/DemoData/score_1.sas";
run;
```
In an operation 234, the parameters that describe each validated predictive model and the computed validation criterion value(s) may be stored in computer-readable medium 108 in association with the hyperparameters used to train the validated predictive model.

In an operation 236, a determination is made concerning whether there is another train/validate cycle to process based on the number of train/validate cycles k for cross validation indicated in operation 216 and a current iteration number of operation 228. When there is another train/validate cycle to process, processing continues in operation 228 to select the next training sample and the next validation sample. When there is not another train/validate cycle to process, processing continues in an operation 240.

Referring to FIG. 2B, in operation 240, a trained predictive model of the selected predictive type model having the best validation criterion value(s) is determined from the stored validation criterion value(s). For example, a minimum validation criterion value may be identified from the stored validation criterion values, and the hyperparameters and other characteristics of the trained predictive model having the minimum value of the stored validation criterion value(s) may be selected to define the determined best predictive model of the selected predictive type model. In alternative embodiments, a maximum validation criterion value may be used to determine the best predictive model of the selected predictive type model.

In an operation 242, the selected best predictive model of the selected predictive type model is scored using each observation vector read from assessment dataset 1502 and the associated hyperparameters and other characteristics of the selected best predictive model to compute an assessment criterion value based on the assessment criterion selected in operation 222. For illustration, the following code illustrates scoring of the trained decision tree predictive type model:
```
data data_post_score;
    set data_to_score;
    % include "/opt/sasinside/DemoData/score_1.sas";
run;
```
The number of true positives, false positives, false negatives, and true negatives are computed from the assessment results and used to compute the assessment criterion value based on the selected assessment criterion method. When the assessment criterion method selected is "Value", a new model assessment metric is computed that is defined as a maximum difference between a cumulative loss reduction by true positives and a cumulative loss increase by false positives identified using the scored, best predictive model of the selected predictive type model with assessment dataset 1502. For illustration, referring to FIG. 2C, in an operation 260, each observation vector included in assessment dataset 1502 is ranked in descending order based on a predicted posterior probability value.

In an operation 262, a cumulative loss reduction value and a cumulative loss increase value are both initialized for example to zero.

In an operation 264, an observation vector is selected from the rank ordered observation vectors. For example, the observation vector having a highest ranked predicted posterior probability value is selected. A loss reduction weight value for the selected observation vector is selected as the value of the value variable indicated in operation 206 or as the single value v indicated in operation 206. A loss increase weight value for the selected observation vector is selected as the cost value of the cost variable indicated in operation 208 or as the single cost value c indicated in operation 208. The response variable value for the selected observation vector is also selected as the event value.

In an operation 266, a weighted loss reduction value is computed by multiplying the selected reduction weight value by the selected response variable value.

In an operation 268, the computed weighted loss reduction value is added to the cumulative loss reduction value.

In an operation 270, a weighted loss increase value is computed by multiplying the selected increase weight value by one minus the selected response variable value.

In an operation 272, the computed weighted loss increase value is added to the cumulative loss increase value.

In an operation 274, a difference between cumulative loss reduction value and the cumulative loss increase value is computed.

In an operation 276, the computed difference may be stored in computer-readable medium 108 in association with the predicted posterior probability value of the selected observation vector.

In an operation 278, a determination is made concerning whether there is another observation vector included in assessment dataset 1502 to process. When there is another observation vector to process, processing continues in an operation 280. When there is not another observation vector to process, processing continues in an operation 282.

In operation 280, a next observation vector is selected from the rank ordered observation vectors and processing continues in operation 266. For example, an observation vector having a next highest ranked predicted posterior probability value is selected. A loss reduction weight value for the selected next observation vector is selected as the value of the value variable indicated in operation 206 or as the single value v indicated in operation 206. A loss increase weight value for the selected next observation vector is selected as the cost value of the cost variable indicated in operation 208 or as the single cost value c indicated in operation 208. The response variable value for the selected next observation vector is also selected as the event value.

In operation 282, a maximum computed difference value and the predicted posterior probability value associated with the maximum computed difference value are identified as the assessment criterion value and a predictive model threshold value, respectively, for the selected best predictive model of the selected predictive type model.

To illustrate, sample assessment results are shown in Table II below:

TABLE II

| Observation vector number | Value variable | Response variable | Predicted Probability |
|---|---|---|---|
| 1 | 500 | 0 | 0.229 |
| 2 | 10 | 1 | 0.722 |
| 3 | 750 | 0 | 0.197 |
| 4 | 800 | 1 | 0.996 |
| 5 | 200 | 0 | 0.779 |
| 6 | 600 | 0 | 0.181 |
| 7 | 790 | 1 | 0.810 |
| 8 | 300 | 0 | 0.725 |
| 9 | 100 | 0 | 0.496 |
| 10 | 50 | 1 | 0.737 |

In the example, the single cost value c indicated in operation 208 was 20. The rank ordered observations are shown in Table III below:

TABLE III

| Observation vector number | Value variable | Response variable | Predicted Probability |
|---|---|---|---|
| 4 | 800 | 1 | 0.996 |
| 7 | 790 | 1 | 0.810 |
| 5 | 200 | 0 | 0.779 |
| 10 | 50 | 1 | 0.737 |
| 8 | 300 | 0 | 0.725 |
| 2 | 10 | 1 | 0.722 |
| 9 | 100 | 0 | 0.496 |
| 1 | 500 | 0 | 0.229 |
| 3 | 750 | 0 | 0.197 |
| 6 | 600 | 0 | 0.181 |

A highest probability is 0.996 for a 4th observation vector in assessment dataset 1502, and a smallest probability is 0.181 for a 6th observation vector.

Cumulative results are shown in Table IV below:

TABLE IV

| Observation vector number | Value variable | Response variable | Predicted Probability | Loss Reduction | Cumulative loss reduction | Loss Increase | Cumulative loss increase | Difference |
|---|---|---|---|---|---|---|---|---|
| 4 | 800 | 1 | 0.9959 | 800 | 800 | 0 | 0 | 800 |
| 7 | 790 | 1 | 0.8097 | 790 | 1590 | 0 | 0 | 1590 |
| 5 | 200 | 0 | 0.7794 | 0 | 1590 | 20 | 20 | 1570 |
| 10 | 50 | 1 | 0.7370 | 50 | 1640 | 0 | 20 | 1620 |
| 8 | 300 | 0 | 0.7245 | 0 | 1640 | 20 | 40 | 1600 |
| 2 | 10 | 1 | 0.7221 | 10 | 1650 | 0 | 40 | 1610 |
| 9 | 100 | 0 | 0.4962 | 0 | 1650 | 20 | 60 | 1590 |

TABLE IV-continued

| Observation vector number | Value variable | Response variable | Predicted Probability | Loss Reduction | Cumulative loss reduction | Loss Increase | Cumulative loss increase | Difference |
|---|---|---|---|---|---|---|---|---|
| 1 | 500 | 0 | 0.2290 | 0 | 1650 | 20 | 80 | 1570 |
| 3 | 750 | 0 | 0.1967 | 0 | 1650 | 20 | 100 | 1550 |
| 6 | 600 | 0 | 0.1812 | 0 | 1650 | 20 | 120 | 1530 |

The assessment criterion value is 1620, and the predictive model threshold value is 0.7370. The computation can be extended to a more generic function of TP, FP, TN, FN to take other factors into account, such as customer satisfaction. The assessment criterion value can be normalized by dividing by a total value variable amount.

Referring again to FIG. 2B, in an operation 244, the parameters that describe each validated predictive model and the computed assessment criterion value, and the predictive model threshold value, if any, may be stored in computer-readable medium 108 in association with the associated hyperparameters and other characteristics of the selected best predictive model of the selected predictive type model.

In an operation 246, a determination is made concerning whether there is another predictive type model of the plurality of predictive type models to process. When there is another predictive type model to process, processing continues in operation 226 to select and process the next predictive type model of the plurality of predictive type models. When there is not another predictive type model to process, processing continues in an operation 248.

In operation 248, a trained predictive model of the plurality of predictive type models having the best assessment criterion value is determined from the stored assessment criterion value. For example, a minimum assessment criterion value may be identified from the stored assessment criterion values, and the hyperparameters and other characteristics of the trained predictive model having the minimum value of the stored assessment criterion values may be selected to define the determined best predictive model of the plurality of predictive type models. In alternative embodiments, a maximum validation criterion value may be used to determine the best predictive model of the plurality of predictive type models.

In an operation 250, the predictive model threshold value, if any, the hyperparameters and other characteristics for the selected best predictive model are written to and stored in predictive model description 126.

Figure 16:
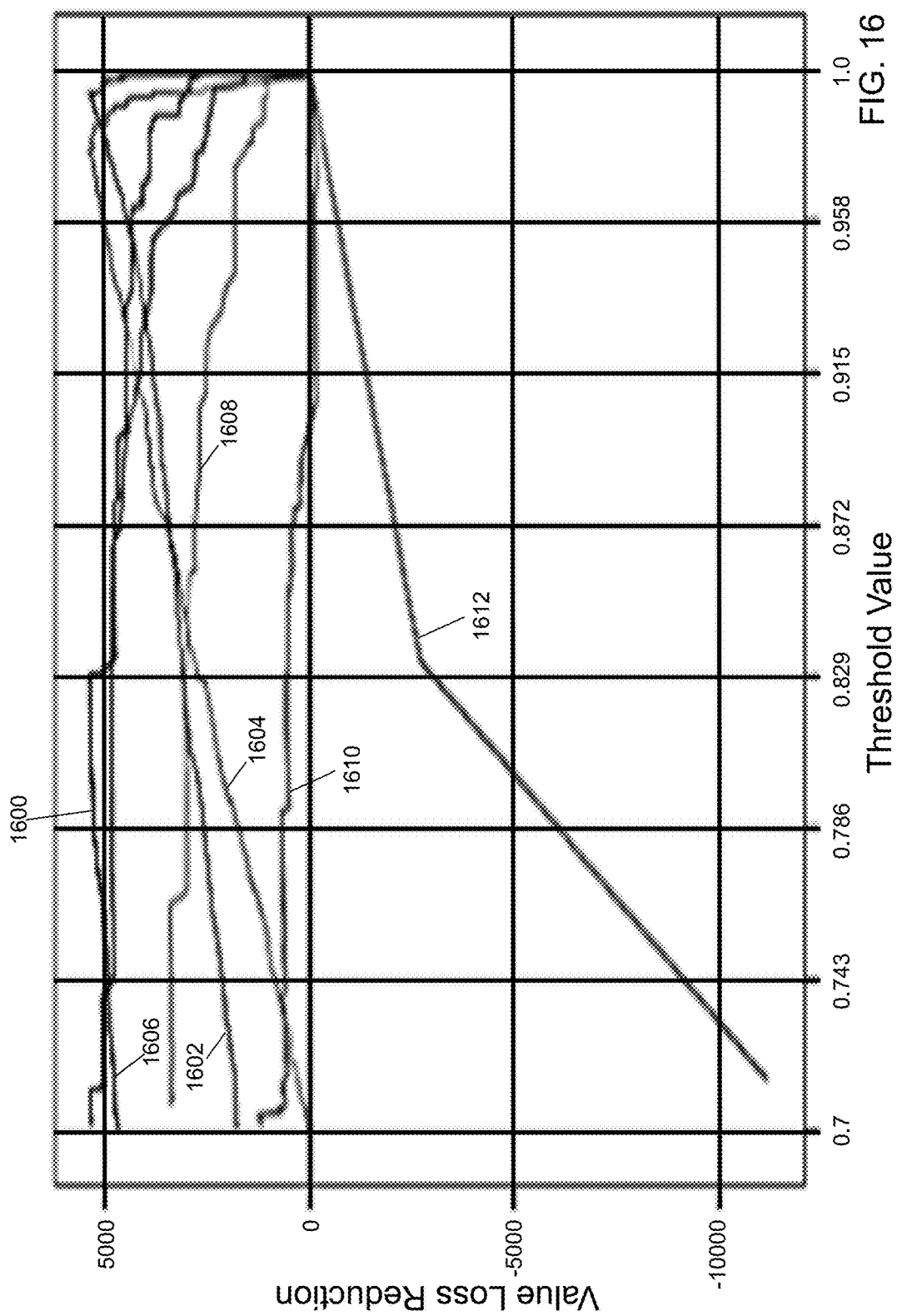
FIG. 16 shows a graph of illustrative model performance values computed by the predictive model selection device of FIG. 1 for a plurality of prediction type models in accordance with an illustrative embodiment.

Referring to FIG. 16, the "Value" assessment criterion method assessment criterion values for a second dataset with seven different predictive type models selected in operation 218 is shown in accordance with an illustrative embodiment. The second dataset contained 284,807 credit cards transactions in September 2013 by European cardholders that occurred over two days. Among all of the transactions, 492 were fraudulent.

The seven different predictive type models were 1) forest model with the autotune option (first assessment curve 1600), 2) gradient boosting model without the autotune option (first assessment curve 1602), 3) gradient boosting model with the autotune option (third assessment curve 1604), 4) forest model without the autotune option (fourth assessment curve 1606), 5) neural network model with the autotune option (fifth assessment curve 1608), 6) decision tree model without the autotune option (sixth assessment curve 1610), and 7) decision tree model with the autotune option (seventh assessment curve 1612). Each assessment curve is a plot of the difference value as a function of the predicted posterior probability value. The champion model is a forest predictive model trained using the autotune option. The predictive model threshold value is 0.8291 and results in a difference value of 5367.40.

Referring to FIG. 17, an assessment table 1700 compares the "Value" assessment criterion method assessment criterion values for the second dataset with nine different predictive type models selected in operation 218 to the "F-score" assessment criterion method assessment criterion values, the "AUC" assessment criterion method assessment criterion values, and the "Misclassification Rate" assessment criterion method assessment criterion values in accordance with an illustrative embodiment. A first column 1702 shows a predictive type model descriptor. A second column 1704 shows an assessment criterion value using the "Value" assessment criterion method. A third column 1706 shows a predictive model threshold value using the "Value" assessment criterion method. A fourth column 1708 shows an assessment criterion value using the "F-score" assessment criterion method. A fifth column 1710 shows a predictive model threshold value using the "F-score" assessment criterion method. A sixth column 1712 shows an assessment criterion value using the "AUC" assessment criterion method. Using the "AUC" assessment criterion method, no predictive model threshold value is computed. A seventh column 1714 shows a predictive model threshold value using the "Misclassification Rate" assessment criterion method. An eighth column 1716 shows a predictive model threshold value using the "Misclassification Rate" assessment criterion method. The highlighted values indicate the best predictive model using the associated assessment criterion method.

Computation of an assessment criterion value using the "Value" assessment criterion method is straightforward and easy and includes a measure of a value gained in correctly identifying true positives and a cost associated with incorrectly identifying false positives. Computation of the assessment criterion value using the "Value" assessment criterion method also automatically identifies the predictive model threshold value.

Figure 3:
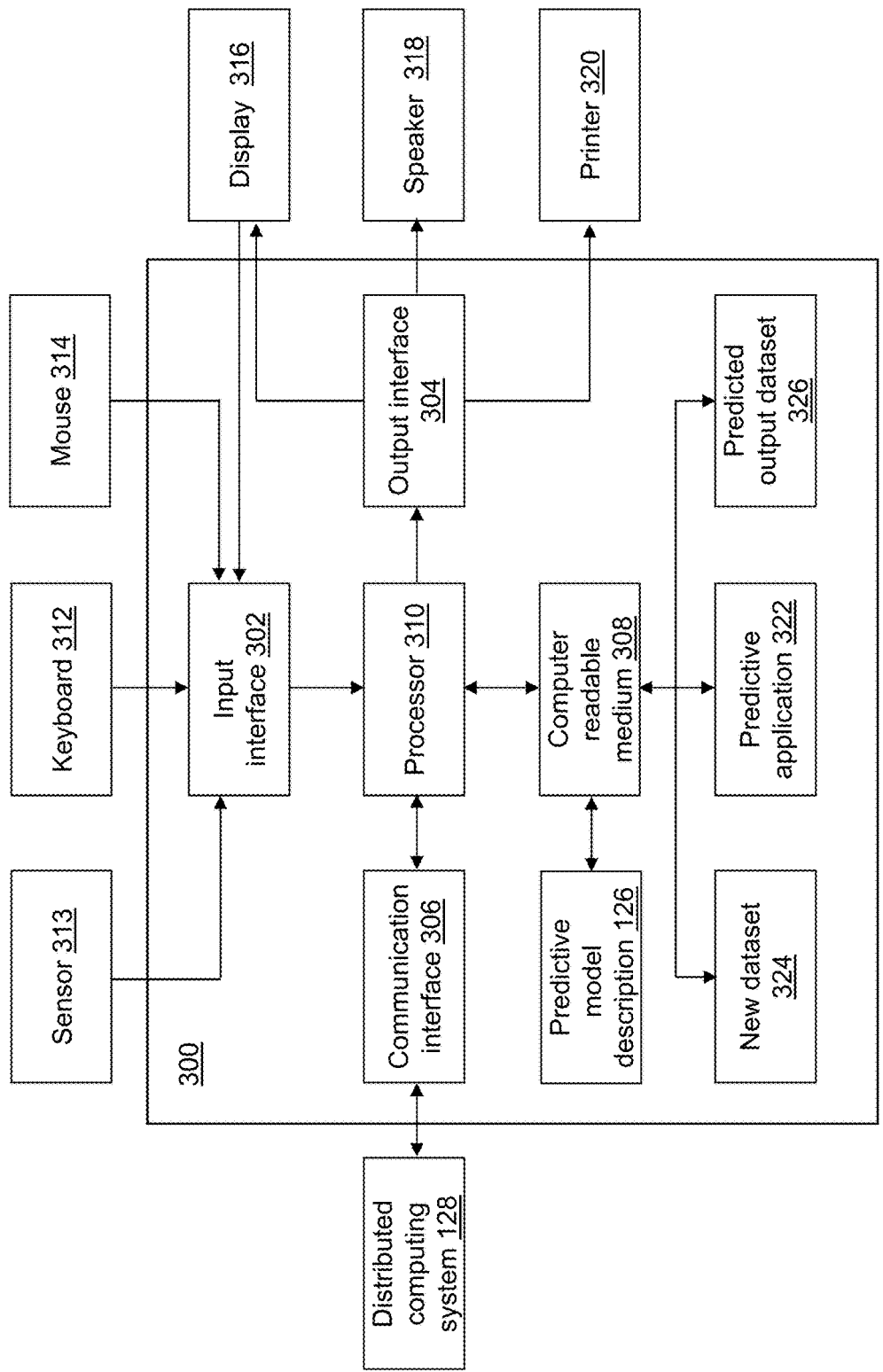
FIG. 3 depicts a block diagram of a prediction device that uses a selected predictive model to predict a result in accordance with an illustrative embodiment.

Referring to FIG. 3, a block diagram of a prediction device 300 is shown in accordance with an illustrative embodiment. Prediction device 300 may include a second input interface 302, a second output interface 304, a second communication interface 306, a second non-transitory computer-readable medium 308, a second processor 310, a predictive application 322, predictive model description 126, a new dataset 324, and predicted output dataset 326. Fewer, different, and/or additional components may be incorporated into prediction device 300. Prediction device 300 and predictive model selection device 100 may be the same or different devices.

Second input interface 302 provides the same or similar functionality as that described with reference to input interface 102 of predictive model selection device 100 though referring to prediction device 300. Second output interface 304 provides the same or similar functionality as that described with reference to output interface 104 of predictive model selection device 100 though referring to prediction device 300. Second communication interface 306 provides the same or similar functionality as that described with reference to communication interface 106 of predictive model selection device 100 though referring to prediction device 300. Data and messages may be transferred between prediction device 300 and distributed computing system 128 using second communication interface 306. Second computer-readable medium 308 provides the same or similar functionality as that described with reference to computer-readable medium 108 of predictive model selection device 100 though referring to prediction device 300. Second processor 310 provides the same or similar functionality as that described with reference to processor 110 of predictive model selection device 100 though referring to prediction device 300.

Predictive application 322 performs operations associated with predicting values for response variable Y using predictive model description 126 based on values for the explanatory variable X (or explanatory variable vector X) stored in new dataset 324. Dependent on the type of data stored in input dataset 124 and new dataset 324, predictive application 322 may identify anomalies as part of process control, for example, of a manufacturing process, classify images, for example, those produced by an electro-cardiogram device, etc. Some or all of the operations described herein may be embodied in predictive application 322. The operations may be implemented using hardware, firmware, software, or any combination of these methods.

Referring to the example embodiment of FIG. 3, predictive application 322 is implemented in software (comprised of computer-readable and/or computer-executable instructions) stored in second computer-readable medium 308 and accessible by second processor 310 for execution of the instructions that embody the operations of predictive application 322. Predictive application 322 may be written using one or more programming languages, assembly languages, scripting languages, etc. Predictive application 322 may be integrated with other analytic tools. For example, predictive application 322 may be implemented using or integrated with one or more SAS software tools such as JMP®, Base SAS, SAS/STAT®, of SAS® Enterprise Miner™ SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of predictive application 322 further may be performed by an ESPE. Predictive application 322 and predictive model selection application 122 further may be integrated applications.

Predictive application 322 may be implemented as a Web application. Predictive application 322 may be integrated with other system processing tools to automatically process data generated as part of operation of an enterprise using second input interface 302, second output interface 304, and/or second communication interface 306 so that appropriate action can be initiated in response. For example, a warning or an alert may be presented using a second display 316, a second speaker 318, a second printer 620, etc. or sent to one or more computer-readable media, display, speaker, printer, etc. of distributed computing system 128 based on predicted values for response variable Y.

Input dataset 124 and new dataset 324 may be generated, stored, and accessed using the same or different mechanisms. Similar to input dataset 124, new dataset 324 may include a plurality of rows and a plurality of columns with the plurality of rows referred to as observation vectors or records, and the columns referred to as variables that are associated with an observation. New dataset 324 may be transposed.

Similar to input dataset 124, new dataset 324 may be stored on second computer-readable medium 308 or on one or more computer-readable media of distributed computing system 128 and accessed by prediction device 300 using second communication interface 306. Data stored in new dataset 324 may be a sensor measurement or a data communication value, for example, from a sensor 313, may be generated or captured in response to occurrence of an event or a transaction, generated by a device such as in response to an interaction by a user with the device, for example, from a second keyboard 312 or a second mouse 314, etc. The data stored in new dataset 324 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in new dataset 324 may be captured at different time points periodically, intermittently, when an event occurs, etc. One or more columns may include a time value. Similar to input dataset 124, data stored in new dataset 324 may be generated as part of the IoT, and some or all data may be pre- or post-processed by an ESPE.

Similar to input dataset 124, new dataset 324 may be stored in various compressed formats such as a coordinate format, a compressed sparse column format, a compressed sparse row format, etc. New dataset 324 further may be stored using various structures as known to those skilled in the art including a file system, a relational database, a system of tables, a structured query language database, etc. on predictive model selection device 100, on prediction device 300, and/or on distributed computing system 128. Prediction device 300 and/or distributed computing system 128 may coordinate access to new dataset 324 that is distributed across a plurality of computing devices. For example, new dataset 324 may be stored in a cube distributed across a grid of computers as understood by a person of skill in the art. As another example, new dataset 324 may be stored in a multi-node Hadoop® cluster. As another example, new dataset 324 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in new dataset 324.

Figure 4:
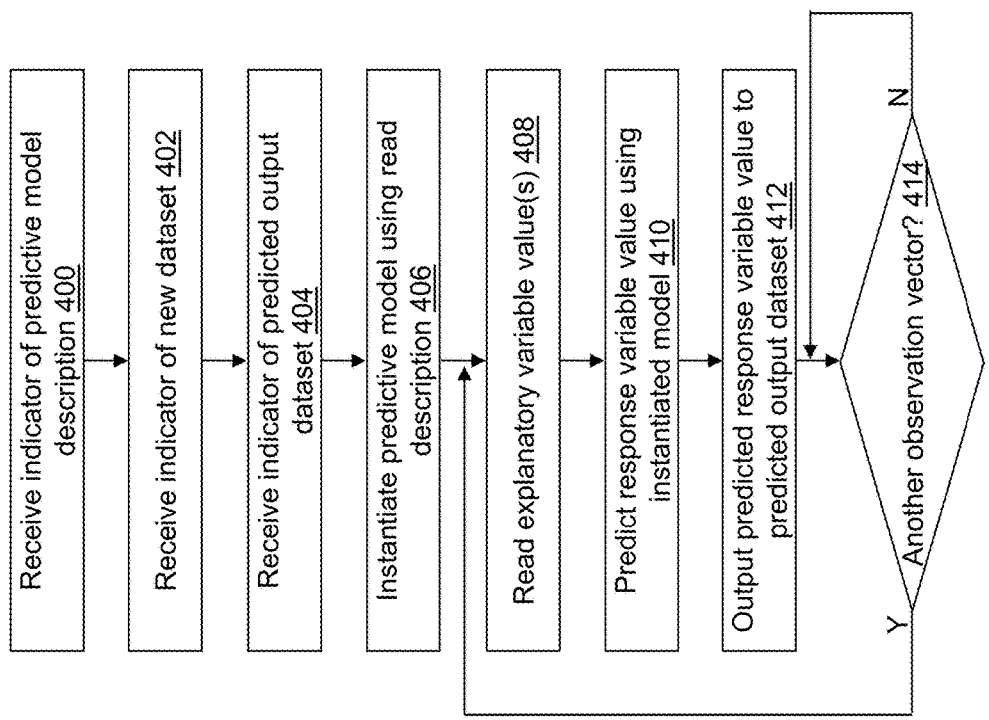
FIG. 4 depicts a flow diagram illustrating examples of operations performed by the prediction device of FIG. 3 in accordance with an illustrative embodiment.

Referring to FIG. 4, example operations of predictive application 322 are described. Additional, fewer, or different operations may be performed depending on the embodiment of predictive application 322. The order of presentation of the operations of FIG. 4 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 400, a thirteenth indicator may be received that indicates predictive model description 126. For example, the thirteenth indicator indicates a location and a name of predictive model description 126. As an example, the thirteenth indicator may be received by predictive application 322 after training from a user interface window or after entry by a user into a user interface window. In an alternative embodiment, predictive model description 126 may not be selectable. For example, a most recently created predictive model description may be used automatically.

In an operation 402, a fourteenth indicator may be received that indicates new dataset 324. For example, the fourteenth indicator indicates a location and a name of new dataset 324. As an example, the fourteenth indicator may be received by predictive application 322 after training from a user interface window or after entry by a user into a user interface window. In an alternative embodiment, new dataset 324 may not be selectable. For example, a most recently created dataset may be used automatically.

In an operation 404, a fifteenth indicator may be received that indicates predicted output dataset 326. For example, the fifteenth indicator indicates a location and a name of predicted output dataset 326. As an example, the fifteenth indicator may be received by predictive application 322 after training from a user interface window or after entry by a user into a user interface window. In an alternative embodiment, predicted output dataset 326 may not be selectable. For example, a default name and location for predicted output dataset 326 may be used automatically.

In an operation 406, a predictive model is instantiated based on the predictive model description read from predictive model description 126. For example, the hyperparameter value(s) and the other characteristics that define the predictive model are used to instantiate the predictive model.

In an operation 408, a value(s) x for the explanatory variable X is read from a next line of new dataset 324 or optionally is received from an ESPE.

In an operation 410, a predicted value y for the response variable Y is predicted using the instantiated predictive model and the read value(s) x.

In an operation 412, the predicted value y for the response variable Y is output to predicted output dataset 326. The value x and/or other values read from new dataset 324 further may be output to predicted output dataset 326. The predicted value y may be output using a second display 316, a second speaker 318, a second printer 320, or may be output to another device using distributed computing system 128. For example, an alert message may be sent to a smart phone.

In an operation 414, a determination is made concerning whether there is another observation vector to process. When there is another observation vector to process, processing continues in operation 408. When there is not another observation vector to process, processing continues in operation 414 to wait for receipt of another observation vector, for example, from an ESPE, or processing is done.

Figure 5:
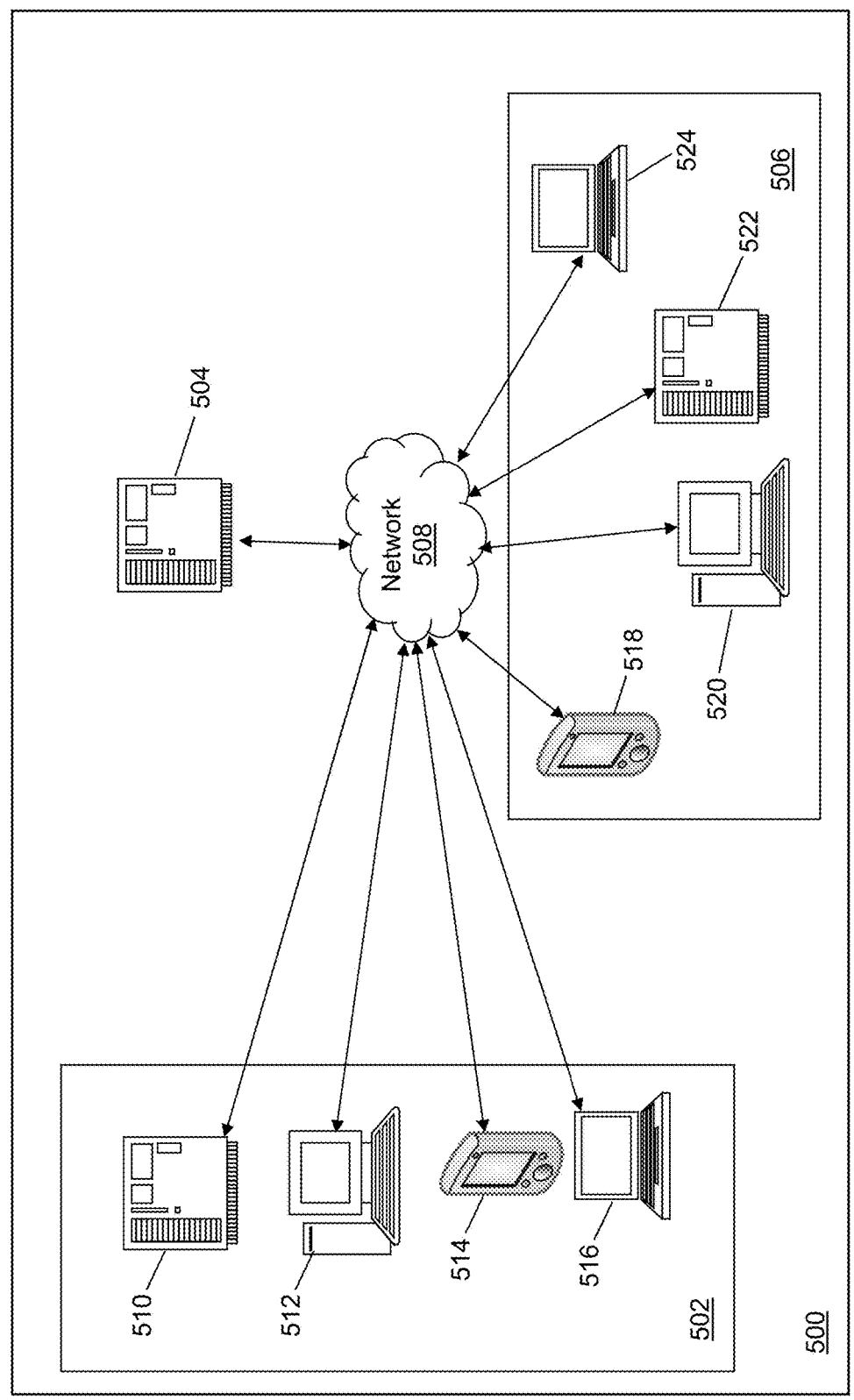
FIG. 5 depicts a block diagram of a stream processing system in accordance with an illustrative embodiment.

Referring to FIG. 5, a block diagram of a stream processing system 500 is shown in accordance with an illustrative embodiment. In an illustrative embodiment, stream processing system 500 may include an event publishing system 502, a ESP device 504, an event subscribing system 506, and a network 508. Each of event publishing system 502, ESP device 504, and event subscribing system 506 may be composed of one or more discrete devices in communication through network 508.

Event publishing system 502 includes, is integrated with, and/or communicates with one or more sensors, data generation devices, data capture devices, etc. For example, a sensor may produce a sensor signal value referred to as a measurement data value representative of a measure of a physical quantity in an environment to which the sensor is associated and generate a corresponding measurement datum that typically is associated with a time that the measurement datum is generated. The environment to which the sensor is associated for monitoring may include a surveillance system, a medical imaging device, a power grid system, a telecommunications system, a fluid (e.g., oil, gas, water, etc.) pipeline, a transportation system, an industrial device, a medical device, an appliance, a vehicle, a computing device, etc. Example sensors include a camera or other image creation device, a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system. As another example, a data generation device may be a computing device that generates a measurement data value in response to occurrence of an event. As still another example, a data capture device may be a computing device that receives a measurement data value generated by another device that may be in response to an event.

For example, a truck may be equipped with hundreds of sensors though as autonomous vehicle technology advances, the number of sensors is increasing rapidly. These sensors stream all types of events that are valuable to both a truck driver and a truck manufacturer. Some events require immediate reactions via Edge Analytics while others need to be processed in the Cloud where more comprehensive and detailed analysis is performed. However, the deployment of analytic tools and models in the Cloud that meets the requirements of large scale, geographically distributed, and highly dynamic sensors is challenging.

Event publishing system 502 publishes the measurement data value to ESP device 504 as an "event". An event is a data record that reflects something that has happened and is a data record. An event object is stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an "Update" opcode. An upsert opcode updates the event object if a key field already exists; otherwise, the event object is inserted. ESP device 504 receives the measurement data value in an event stream, processes the measurement data value, and identifies a computing device of event subscribing system 506 to which the processed measurement data value is sent.

Network 508 may include one or more networks of the same or different types. Network 508 can be any type of wired and/or wireless public or private network including a cellular network, a local area network, a wide area network such as the Internet or the World Wide Web, etc. Network 508 further may comprise sub-networks and consist of any number of communication devices.

The one or more computing devices of event publishing system 502 may include computing devices of any form factor such as a server computer 510, a desktop 512, a smart phone 514, a laptop 516, a personal digital assistant, an integrated messaging device, a tablet computer, a point of sale system, a transaction system, etc. Event publishing system 502 can include any number and any combination of form factors of computing devices that may be organized into subnets. The computing devices of event publishing system 502 send and receive signals through network 508 to/from another of the one or more computing devices of event publishing system 502 and/or to/from ESP device 504. The one or more computing devices of event publishing system 502 may communicate using various transmission media that may be wired and/or wireless as understood by those skilled in the art. The one or more computing devices of event publishing system 502 may be geographically dispersed from each other and/or co-located. Each computing device of the one or more computing devices of event publishing system 502 may be executing one or more event publishing application.

Figure 6:
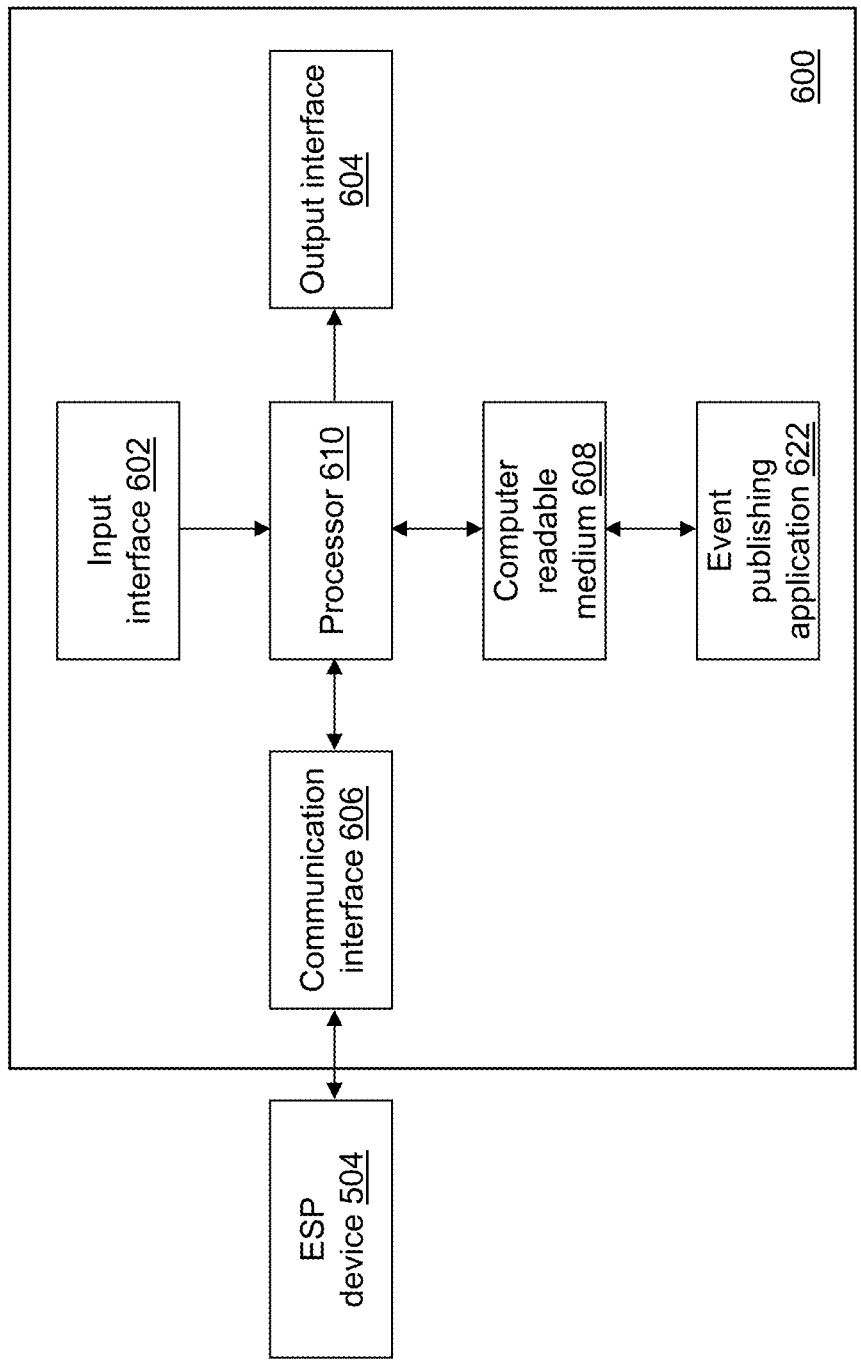
FIG. 6 depicts a block diagram of an event publishing device of an event publishing system of the stream processing system of FIG. 5 in accordance with an illustrative embodiment.

For illustration, referring to FIG. 6, a block diagram of an event publishing device 600 is shown in accordance with an example embodiment. Event publishing device 600 is an example computing device of event publishing system 502. For example, each of server computer 510, desktop 512, smart phone 514, and laptop 516 may be an instance of event publishing device 600. Event publishing device 600 may include a third input interface 602, a third output interface 604, a third communication interface 606, a third non-transitory computer-readable medium 608, a third processor 610, and an event publishing application 622. Each computing device of event publishing system 502 may be executing event publishing application 622 of the same or a different type.

Referring again to FIG. 5, the one or more computing devices of event subscribing system 506 may include computers of any form factor such as a smart phone 518, a desktop 520, a server computer 522, a laptop 524, a personal digital assistant, an integrated messaging device, a tablet computer, etc. Event subscribing system 506 can include any number and any combination of form factors of computing devices. The computing devices of event subscribing system 506 send and receive signals through network 508 to/from ESP device 504. The one or more computing devices of event subscribing system 506 may be geographically dispersed from each other and/or co-located. The one or more computing devices of event subscribing system 506 may communicate using various transmission media that may be wired and/or wireless as understood by those skilled in the art. Each computing device of the one or more computing devices of event subscribing system 506 may be executing one or more event subscribing application.

Figure 9:
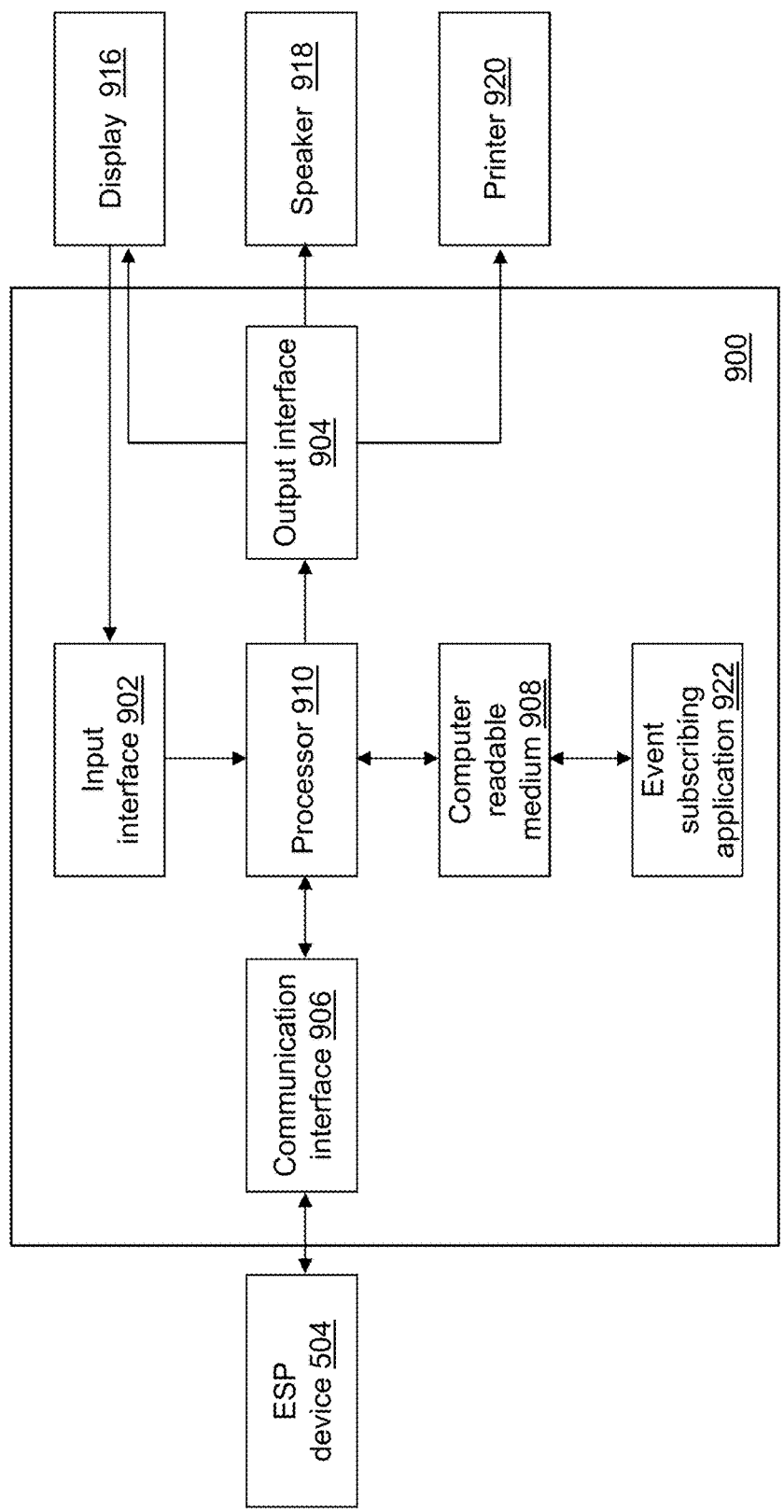
FIG. 9 depicts a block diagram of an event subscribing device of an event subscribing system of the stream processing system of FIG. 5 in accordance with an illustrative embodiment.

For illustration, referring to FIG. 9, a block diagram of an event subscribing device 900 is shown in accordance with an example embodiment. Event subscribing device 900 is an example computing device of event subscribing system 506. For example, each of smart phone 518, desktop 520, server computer 522, and laptop 524 may be an instance of event subscribing device 900. Event subscribing device 900 may include a fourth input interface 902, a fourth output interface 904, a fourth communication interface 906, a fourth computer-readable medium 908, a fourth processor 910, and an event subscribing application 922. Each computing device of event subscribing system 506 may be executing event subscribing application 922 of the same or different type.

Referring again to FIG. 5, ESP device 504 can include any form factor of computing device. For illustration, FIG. 5 represents ESP device 504 as a server computer. In general, a server computer may include faster processors, additional processors, more disk memory, and/or more random access memory (RAM) than a client computer and support multi-threading as understood by a person of skill in the art. ESP device 504 sends and receives signals through network 508 to/from event publishing system 502 and/or to/from event subscribing system 506. ESP device 504 may communicate using various transmission media that may be wired and/or wireless as understood by those skilled in the art. ESP device 504 may be implemented on a plurality of computing devices of the same or different type. Stream processing system 500 further may include a plurality of ESP devices.

Figure 11:
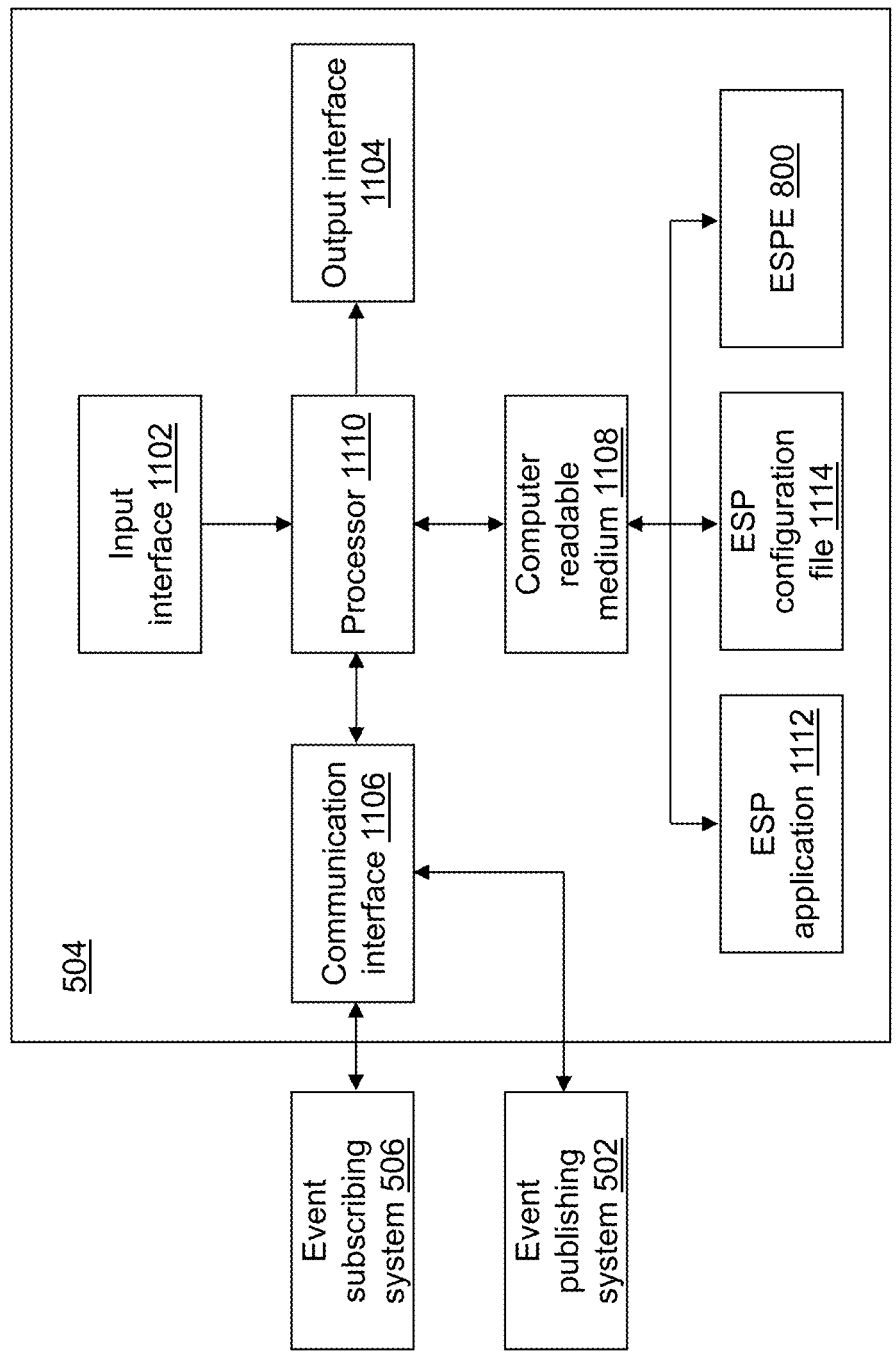
FIG. 11 depicts a block diagram of an ESP device of the stream processing system of FIG. 5 in accordance with an illustrative embodiment.

For illustration, referring to FIG. 11, a block diagram of ESP device 504 is shown in accordance with an example embodiment. ESP device 504 may include a fifth input interface 1102, a fifth output interface 1104, a fifth communication interface 1106, a fifth computer-readable medium 1108, a fifth processor 1110, an ESP application 1112, an ESP configuration file 1114, and an ESP engine (ESPE) 1116. ESP device 504 executes ESP application 1112 that reads ESP configuration file 1114 to instantiate ESPE 800 to perform the operations of predictive model selection application 122 and of predictive application 322.

Referring to FIG. 6, each event publishing device 600 of event publishing system 502 may include the same or different components and combinations of components. Fewer, different, and additional components may be incorporated into event publishing device 600. Event publishing device 600 may be part of the Internet of Things (IoT), where things (e.g., machines, devices, phones, sensors, smart meters for energy, personal wearable devices, health monitoring devices, autonomous vehicle devices, robotic components, identification devices, etc.) can be connected to networks and the data from these things collected and processed within the things and/or external to the things. For example, event publishing device 600 can include one or more types of the same or different sensors, and high value analytics can be applied to identify hidden relationships and drive increased efficiencies. This can apply to both big data analytics and real-time analytics. Event publishing device 600 may be referred to as an edge device, and may include edge computing circuitry. Event publishing device 600 may provide a variety of stored or generated data, such as network data or data specific to the network devices themselves.

In one example application, ESP can be employed for predictive maintenance in the trucking industry, which is responsible for moving around 10.5 billion tons of freight over 279 billion miles per year. ESP can be used to predict part failures and keep trucks on the road longer. Trucks may have hundreds of sensors that collect many different types of data, for example, from oil temperatures to engine load to turbo boost. Edge devices on the trucks can allow a trucking company to weed out data as close to the source as possible, and can initiate action in response to pertinent information in sub-second time frames. This way, the trucking company does not have to move all of their data through network 508 or even store it in the cloud or on-premises in some situations. Also, by monitoring, filtering, and analyzing data at the source, the truck driver can be instantly alerted when, for example, oil temperature and turbo boost numbers spike at the same time. ESP can be used to recognize this pattern, which can trigger an alert that turbocharger service is needed, and the truck can be fixed in a nearby maintenance facility before any major damage occurs to the truck.

In addition to edge analytics performed at the individual truck level, there can be multi-phase analytics for ESP running on-premises or in the cloud, where the trucking company can be enabled to analyze massive amounts of data across a fleet of trucks. Cross-entity analytics can be performed by aggregating data from all of the IoT gateways that are installed on their trucks in their fleet.

ESP can further be use enable the trucking company to take what it learned from the historical data, train new models, update existing models, and bring the new or revised models back to the edge (e.g., the truck). These operations can be performed dynamically (e.g., on the fly) and while the trucks are still on the road.

Third input interface 602 provides the same or similar functionality as that described with reference to input interface 102 of predictive model selection device 100 though referring to event publishing device 600. Third output interface 604 provides the same or similar functionality as that described with reference to output interface 104 of predictive model selection device 100 though referring to event publishing device 600. Third communication interface 606 provides the same or similar functionality as that described with reference to communication interface 106 of predictive model selection device 100 though referring to event publishing device 600. Data and messages may be transferred between event publishing device 600 and ESP device 504 using third communication interface 606. Third computer-readable medium 608 provides the same or similar functionality as that described with reference to computer-readable medium 108 of predictive model selection device 100 though referring to event publishing device 600. Third processor 610 provides the same or similar functionality as that described with reference to processor 110 of predictive model selection device 100 though referring to event publishing device 600.

Event publishing application 622 performs operations associated with generating, capturing, and/or receiving a measurement data value and publishing the measurement data value in an event stream to one or more computing devices of event subscribing system 506 through ESP device 504. The operations may be implemented using hardware, firmware, software, or any combination of these methods. Referring to the example embodiment of FIG. 6, event publishing application 622 is implemented in software (comprised of computer-readable and/or computer-executable instructions) stored in third computer-readable medium 608 and accessible by third processor 610 for execution of the instructions that embody the operations of event publishing application 622. Event publishing application 622 may be written using one or more programming languages, assembly languages, scripting languages, etc. Event publishing application 622 may be implemented as a Web application.

Figure 7:
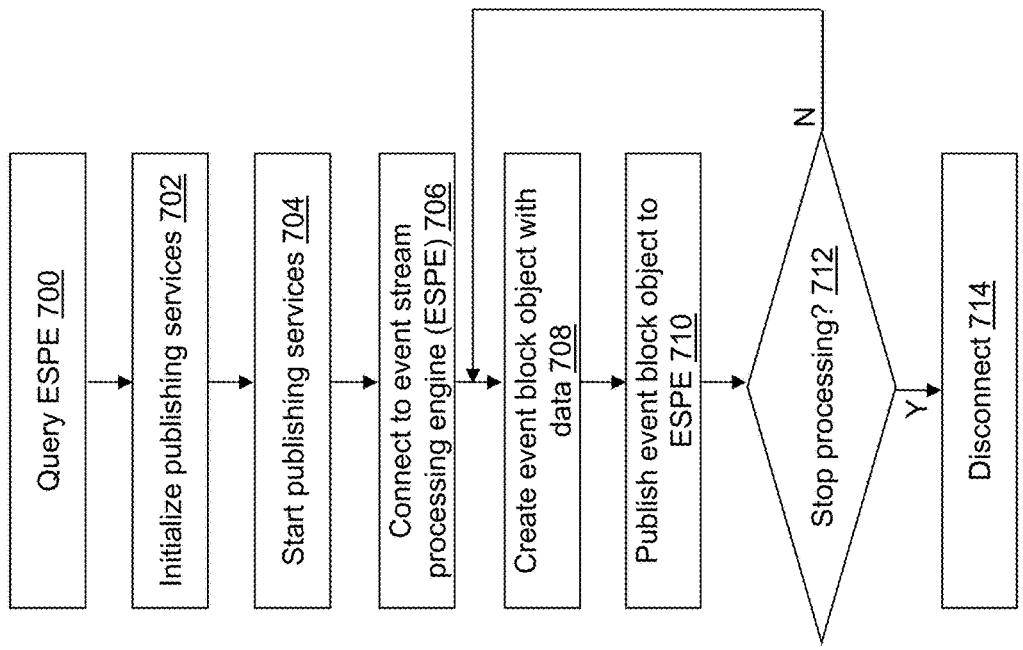
FIG. 7 depicts a flow diagram illustrating examples of operations performed by the event publishing device of FIG. 6 in accordance with an illustrative embodiment.

Referring to FIG. 7, example operations associated with event publishing application 622 are described. Additional, fewer, or different operations may be performed depending on the embodiment. The order of presentation of the operations of FIG. 7 is not intended to be limiting. A user can interact with one or more user interface windows presented to the user in a display under control of event publishing application 622 independently or through a browser application in an order selectable by the user. Although some of the operational flows are presented in sequence, the various operations may be performed in various repetitions, concurrently, and/or in other orders than those that are illustrated. For example, a user may execute event publishing application 622, which causes presentation of a first user interface window, which may include a plurality of menus and selectors such as drop-down menus, buttons, text boxes, hyperlinks, etc. associated with event publishing application 622 as understood by a person of skill in the art. As further understood by a person of skill in the art, various operations may be performed in parallel, for example, using a plurality of threads or a plurality of computing devices such as a grid or a cloud of computing devices.

Figure 8:
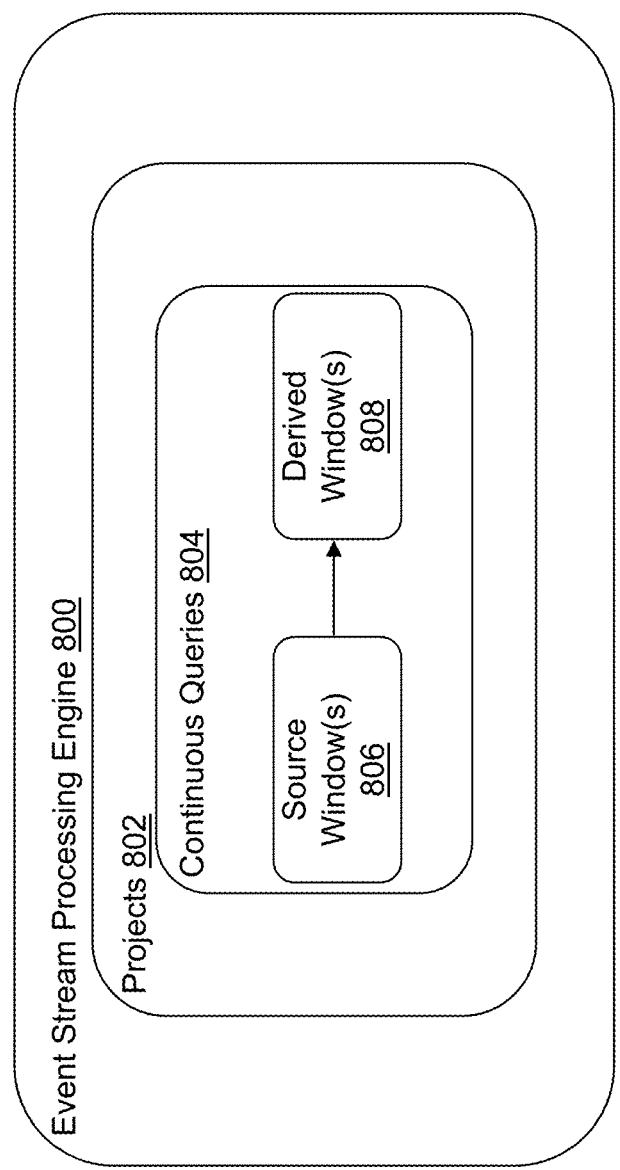
FIG. 8 depicts a block diagram of an event stream processing (ESP) engine executing on an ESP device of the stream processing system of FIG. 5 in accordance with an illustrative embodiment.

In an operation 700, an ESPE 800 is queried, for example, to discover projects 802, continuous queries 804, windows 806, 808, window schema, and window edges currently running in ESPE 800. For example, referring to FIG. 8, the components of ESPE 800 are shown in accordance with an illustrative embodiment. In an illustrative embodiment, event publishing device 600 queries ESPE 800.

ESPE 800 may include one or more projects 802. A project may be described as a second-level container in an engine model managed by ESPE 800 where a thread pool size for the project may be defined by a user. A value of one for the thread pool size indicates that writes are single-threaded. Each project of the one or more projects 802 may include one or more continuous queries 804 that contain data flows, which are data transformations of incoming event streams. The one or more continuous queries 804 may include one or more source windows 806 and one or more derived windows 808.

The engine container is the top-level container in a model that manages the resources of the one or more projects 802. In an illustrative embodiment, for example, there is a single ESPE 800 for each instance of an ESP model executed. Each ESPE 800 has a unique engine name. Additionally, the one or more projects 802 may each have unique project names, and each query may have a unique continuous query name and begin with a uniquely named source window of the one or more source windows 806. Each ESPE 800 may or may not be persistent. Each ESPE 800 is a unique process so the projects/queries/windows need not be uniquely named. They are distinguished by the unique input streams received on ESPE-specific TCP/IP connections.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be an individual record of an event stream. The event object may be created using a variety of formats including binary, alphanumeric, XML, etc. Each event object may include one or more fields designated as a primary ID for the event so ESPE 800 can support the opcodes for events including insert, update, upsert, and delete. As a result, events entering a source window of the one or more source windows 806 may be indicated as insert (I), update (U), delete (D), or upsert (P).

For illustration, an event object may be a packed binary representation of one or more sensor measurements and may include both metadata and measurement data associated with a timestamp value. The metadata may include the opcode indicating if the event represents an insert, update, delete, or upsert, a set of flags indicating if the event is a normal, partial-update, or a retention generated event from retention policy management, and one or more microsecond timestamps. For example, the one or more microsecond timestamps may indicate a sensor data generation time, a data receipt time by event publishing device 600, a data transmit time by event publishing device 600, a data receipt time by ESPE 800, etc.

An event block object may be described as a grouping or package of one or more event objects. An event stream may be described as a flow of event block objects. A continuous query of the one or more continuous queries 804 transforms the incoming event stream made up of streaming event block objects published into ESPE 800 into one or more outgoing event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams are directed to the next set of connected windows as defined by the directed graph. The one or more derived windows 808 are all instantiated windows that are not source windows and that have other windows streaming events into them. The one or more derived windows 808 perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Referring again to FIG. 7, the engine name and host/port to ESPE 800 may be provided as an input to the query and a list of strings may be returned with the names of the projects 802, of the continuous queries 804, of the windows 806, 808, of the window schema, and/or of the window edges of currently running projects of ESPE 800. The host is associated with a host name or Internet Protocol (IP) address of ESP device 504. The port is the port number provided when a publish/subscribe (pub/sub) capability is initialized by ESPE 800. The engine name is the name of ESPE 800 such as the engine name of ESPE 800. The engine name of ESPE 800 and host/port to ESP device 504 may be read from a storage location on third computer-readable medium 608, may be provided on a command line, or otherwise input to or defined by event publishing application 622 as understood by a person of skill in the art.

In an operation 702, publishing services are initialized.

In an operation 704, the initialized publishing services are started, which may create a publishing client for the instantiated event publishing application 622. The publishing client performs the various pub/sub activities for the instantiated event publishing application 622. For example, a string representation of a URL to ESPE 800 is passed to a "Start" function. For example, the URL may include the host:port designation of ESPE 800 executing on ESP device 504, a project of the projects 802, a continuous query of the continuous queries 804, and a window of the source windows 806. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 622 is publishing to more than one source window of ESPE 800, the initialized publishing services may be started to each source window using the associated names (project name, continuous query name, source window name).

Pub/sub is a message-oriented interaction paradigm based on indirect addressing. Each event subscribing device 900 of event subscribing system 506 specifies their interest in receiving information from ESPE 800 by subscribing to specific classes of events, while information sources such as event publishing device 600 publish events to ESPE 800 without directly addressing the data recipients. Stream processing system 500 includes ESPE 800 that receives events from event publishing application 622 executing on event publishing device 600 of event publishing system 502 and that publishes processed events to and publishes further processed events to event subscribing application 922 of event subscribing device 900 of event subscribing system 506.

In an operation 706, a connection is made between event publishing application 622 and ESPE 800 executing on ESP device 504 for each source window of the source windows 806 to which any measurement data value is published. To make the connection, the pointer to the created publishing client may be passed to a "Connect" function. If event publishing application 622 is publishing to more than one source window of ESPE 800, a connection may be made to each started window using the pointer returned for the respective "Start" function call.

In an operation 708, an event block object is created by event publishing application 622 that includes a measurement data value. The measurement data value may have been received, captured, generated, etc., for example, through third communication interface 606 or third input interface 602 or by third processor 610. The measurement data value may be processed before inclusion in the event block object, for example, to change a unit of measure, convert to a different reference system, etc. The event block object may include a plurality of measurement data values measured at different times and/or by different devices.

In an operation 710, the created event block object is published to ESPE 800, for example, using the pointer returned for the respective "Start" function call to the appropriate source window. Event publishing application 622 passes the created event block object to the created publishing client, where the unique ID field in the event block object has been set by event publishing application 622 possibly after being requested from the created publishing client. In an illustrative embodiment, event publishing application 622 may wait to begin publishing until a "Ready" callback has been received from the created publishing client. The event block object is injected into the source window, continuous query, and project associated with the started publishing client.

In an operation 712, a determination is made concerning whether or not processing is stopped. If processing is not stopped, processing continues in operation 708 to continue creating and publishing event block objects. If processing is stopped, processing continues in an operation 714.

In operation 714, the connection made between event publishing application 622 and ESPE 800 through the created publishing client is disconnected, and each started publishing client is stopped.

Referring again to FIG. 9, fewer, different, and additional components may be incorporated into event subscribing device 900. Each event subscribing device 900 of event subscribing system 506 may include the same or different components or combination of components.

Fourth input interface 902 provides the same or similar functionality as that described with reference to input interface 102 of predictive model selection device 100 though referring to event subscribing device 900. Fourth output interface 904 provides the same or similar functionality as that described with reference to output interface 104 of predictive model selection device 100 though referring to event subscribing device 900. Fourth communication interface 906 provides the same or similar functionality as that described with reference to communication interface 106 of predictive model selection device 100 though referring to event subscribing device 900. Data and messages may be transferred between event subscribing device 900 and ESP device 504 using fourth communication interface 906. Fourth computer-readable medium 908 provides the same or similar functionality as that described with reference to computer-readable medium 108 of predictive model selection device 100 though referring to event subscribing device 900. Fourth processor 910 provides the same or similar functionality as that described with reference to processor 110 of predictive model selection device 100 though referring to event subscribing device 900.

Figure 10:
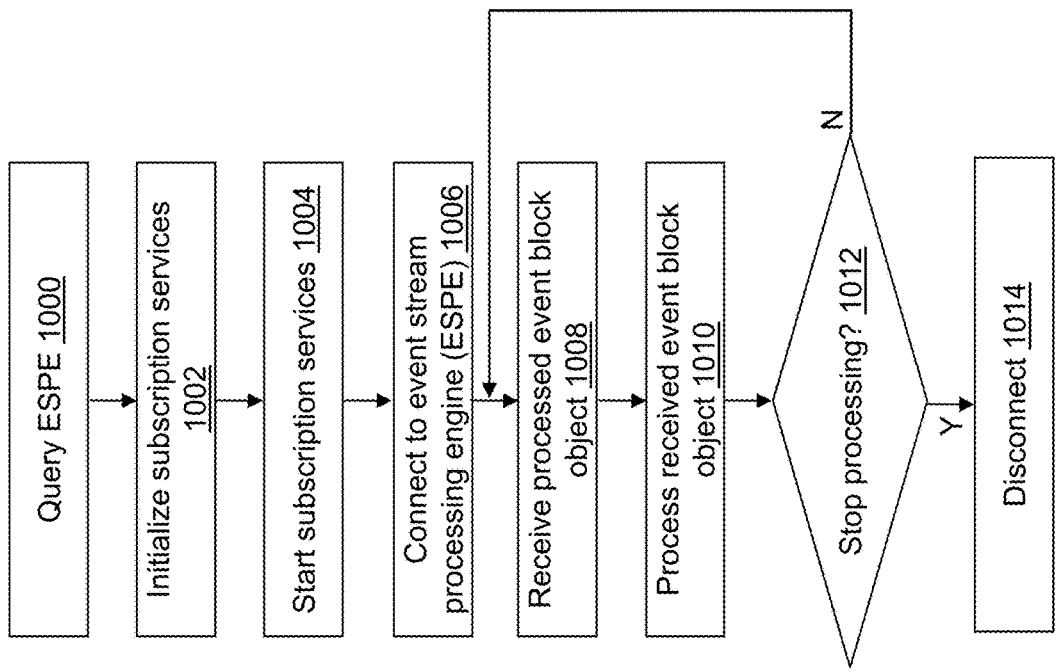
FIG. 10 depicts a flow diagram illustrating examples of operations performed by the event subscribing device of FIG. 9 in accordance with an illustrative embodiment.

Referring to FIG. 10, example operations associated with event subscribing application 912 are described. Additional, fewer, or different operations may be performed depending on the embodiment. The order of presentation of the operations of FIG. 10 is not intended to be limiting.

Similar to operation 700, in an operation 1000, ESPE 800 is queried, for example, to discover names of projects 802, of continuous queries 804, of windows 406,608, of window schema, and of window edges currently running in ESPE 800.

In an operation 1002, subscription services are initialized.

In an operation 1004, the initialized subscription services are started, which may create a subscribing client on behalf of event subscribing application 912 at event subscribing device 900. The subscribing client performs the various pub/sub activities for event subscribing application 912. For example, a URL to ESPE 800 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 1006, a connection may be made between event subscribing application 912 executing on event subscribing device 900 and ESPE 800 through the created subscribing client. To make the connection, the pointer to the created subscribing client may be passed to a "Connect" function and a mostly non-busy wait loop created to wait for receipt of event block objects.

In an operation 1008, an event block object is received by event subscribing application 912 executing on event subscribing device 900.

In an operation 1010, the received event block object is processed based on the operational functionality provided by event subscribing application 912. For example, event subscribing application 912 may extract data from the received event block object and store the extracted data in a database. In addition, or in the alternative, event subscribing application 912 may extract data from the received event block object and send the extracted data to a system control operator display system, an automatic control system, a notification device, an analytic device, etc. In addition, or in the alternative, event subscribing application 912 may extract data from the received event block object and send the extracted data to a post-incident analysis device to further analyze the data. Event subscribing application 912 may perform any number of different types of actions as a result of extracting data from the received event block object. The action may involve presenting information on a fourth display 916 or a fourth printer 920, presenting information using a fourth speaker 918, storing data in fourth computer-readable medium 908, sending information to another device using fourth communication interface 906, etc. A user may further interact with presented information using a fourth mouse 914 and/or a fourth keyboard 912.

In an operation 1012, a determination is made concerning whether or not processing is stopped. If processing is not stopped, processing continues in operation 1008 to continue receiving and processing event block objects. If processing is stopped, processing continues in an operation 1014.

In operation 1014, the connection made between event subscribing application 912 and ESPE 800 through the subscribing client is disconnected, and the subscribing client is stopped.

Referring again to FIG. 11, fewer, different, or additional components may be incorporated into ESP device 504. ESP device 504 receives event block objects that may include measurement data values from event publishing system 502. Fifth computer-readable medium 1108 may provide an electronic storage medium for the received event block objects.

Fifth input interface 1102 provides the same or similar functionality as that described with reference to input interface 102 of predictive model selection device 100 though referring to ESP device 504. Fifth output interface 1104 provides the same or similar functionality as that described with reference to output interface 104 of predictive model selection device 100 though referring to ESP device 504. Third communication interface 1106 provides the same or similar functionality as that described with reference to communication interface 106 of predictive model selection device 100 though referring to ESP device 504. Data and messages may be transferred between ESP device 504 and event publishing system 502 and/or event subscribing system 506 using fifth communication interface 1106. Fifth computer-readable medium 1108 provides the same or similar functionality as that described with reference to computer-readable medium 108 of predictive model selection device 100 though referring to ESP device 504. Fifth processor 1110 provides the same or similar functionality as that described with reference to processor 110 of predictive model selection device 100 though referring to ESP device 504.

ESP application 1112 performs operations associated with coordinating event stream flow between event publishing system 502 and event subscribing system 506 through the one or more computing devices of ESP cluster system 106. The operations may be implemented using hardware, firmware, software, or any combination of these methods. Referring to the example embodiment of FIG. 11, ESP application 1112 is implemented in software (comprised of computer-readable and/or computer-executable instructions) stored in fifth computer-readable medium 1108 and accessible by fifth processor 1110 for execution of the instructions that embody the operations of ESP application 1112. ESP application 1112 may be written using one or more programming languages, assembly languages, scripting languages, etc. ESP application 1112 may be implemented as a Web application.

ESP application 1112 may be developed, for example, using a modeling application programming interface (API) that provides a set of classes with member functions. As an example, the SAS® ESP Engine developed and provided by SAS Institute Inc. of Cary, N.C., USA provides a modeling API that provides a set of classes with member functions. These functions enable ESP application 1112 to instantiate and to embed ESPE 800, possibly with dedicated thread pools into its own process space.

For further illustration, ESP application 1112 may be implemented using an XML Layer defined for SAS® ESP. The XML Layer enables definition of ESPE 800 with dynamic project creations and deletions. For example, an XML client can feed definitions read from ESP configuration file 1114 into ESPE 800.

The basic syntax for an XML model for ESPE 800 is
<engine>
  <projects>
  +<project>
    <contqueries>
    +<contquery>
      <windows>
        +<window-type> </window-type>
      </windows>
      <edges>
        +<edge> </edge>
      </edges>
    </contquery>
    </contqueries>
  </project>
  </projects>
</engine>

<engine> is a global wrapper for ESPE 800 that may include an engine name and a publish/subscribe port number as attributes for ESPE 800 such as in the form "engine name=nameString port=portNumber" . . . . For illustration, <engine name='myanalysis' port='31417'> may be specified for an engine where 31417 specifies the pub/sub port for ESPE 800 named "myanalysis".

<projects> may be a container for a list of one or more project elements of the one or more projects 802 defined by ESPE 800. <project> defines a project of the one or more projects 802 by identifying execution and connectivity attributes and a list of the one or more continuous queries 804 of each project to execute of the one or more projects 802. <project> may include a project name attribute, a thread attribute, a pub/sub mode attribute, a pub/sub port number attribute, etc. The thread attribute defines a thread pool size. The pub/sub mode attribute options may include "none", "auto", and "manual". When "auto" or "manual is specified, the pub/sub port number attribute specifies the port number. For illustration, <project name='analysis' threads='16' pubsub='manual' port='31417'> may be specified for a project.

<contqueries> may be a container for a list of one or more continuous query elements of the one or more continuous queries 804. Each <contquery> defines a continuous query of the one or more continuous queries 804 of the project and includes windows and edges. <contquery> may include a continuous query name attribute, a window attribute, etc.

<windows> is a container of one or more window-type elements. Illustrative window-type elements may include "aggregate", "compute", "copy", "counter", "filter", "functional", "join", "notification", "pattern", "procedural", "source", "textCategory", "textContext", "textSentiment", "union", etc. For illustration, the following may specify window type elements:
<windows>
<window-source name='factInput' . . . </window-source>
<window-source name='dimensionInput' . . . </window-source>
<window-join name='joinedInput' . . . </window-join>
<window-union name='unionedInput' . . . </window-union>
</windows>

Each window-type may include a window type name attribute, a pub/sub mode for the window type as well as other attributes based on the window-type. The following is a list of window types:

A "source" type window specifies a source window of a continuous query. Event streams enter continuous queries by being published or injected into a source window.

A "compute" type window defines a compute window, which enables a one-to-one transformation of input events into output events through the computational manipulation of the input event stream fields.

A "copy" type window makes a copy of a parent window, which can be useful to set new event state retention policies. Retention policies can be set in source and copy windows, and events may be deleted when a windows retention policy is exceeded.

An "aggregate" type window is similar to a compute window in that non-key fields are computed. An aggregate window uses a key field or fields for a group-by condition. Unique key field combinations form their own group within the aggregate window such that events with the same key combination are part of the same group.

A "counter" type window counts events streaming through to monitor a number and a rate at events are being processed.

A "filter" type window specifies a window with a registered Boolean filter function or expression that determines which input events are allowed into the filter window.

A "functional" type window specifies different types of functions to manipulate or transform the data in events. Fields in a functional window can be hierarchical, which can be useful for applications such as web analytics.

A "join" type window takes two input windows and a join type. A join window supports equijoins that are one to many, many to one, or many to many. Both inner and outer joins may be supported.

A "notification" type window sends notifications through email, text, or multimedia message. Any number of delivery channels can be specified to send the notifications. A notification window uses the same underlying language and functions as the functional window.

A "pattern" type window enables the detection of events of interest. A pattern defined in this window type is an expression that logically connects declared events of interest. For example, to define a "pattern" window, events of interest are defined and connected using operators such as "AND", "OR", "FBY", "NOT", "NOTOCCUR", and "IS". The operators can accept optional temporal conditions.

A "procedural" type window enables specification of an arbitrary number of input windows and input-handler functions for each input window (that is, event stream).

A "textCategory" window enables categorization of a text field in incoming events. The text field could generate zero or more categories with scores.

A "textContext" window enables abstraction of classified terms from an unstructured string field. This window type can be used to analyze a string field from an event's input to find classified terms. Events generated from those terms can be analyzed by other window types. For example, a pattern window could follow a "textContext" window to look for tweet patterns of interest.

A "textSentiment" window determines a sentiment of text in a specified incoming text field and a probability of its occurrence. A sentiment value is "positive," "neutral," or "negative." The probability is a value between 0 and 1.

A "union" window specifies a simple join that merges one or more streams with the same schema.

Figure 12:
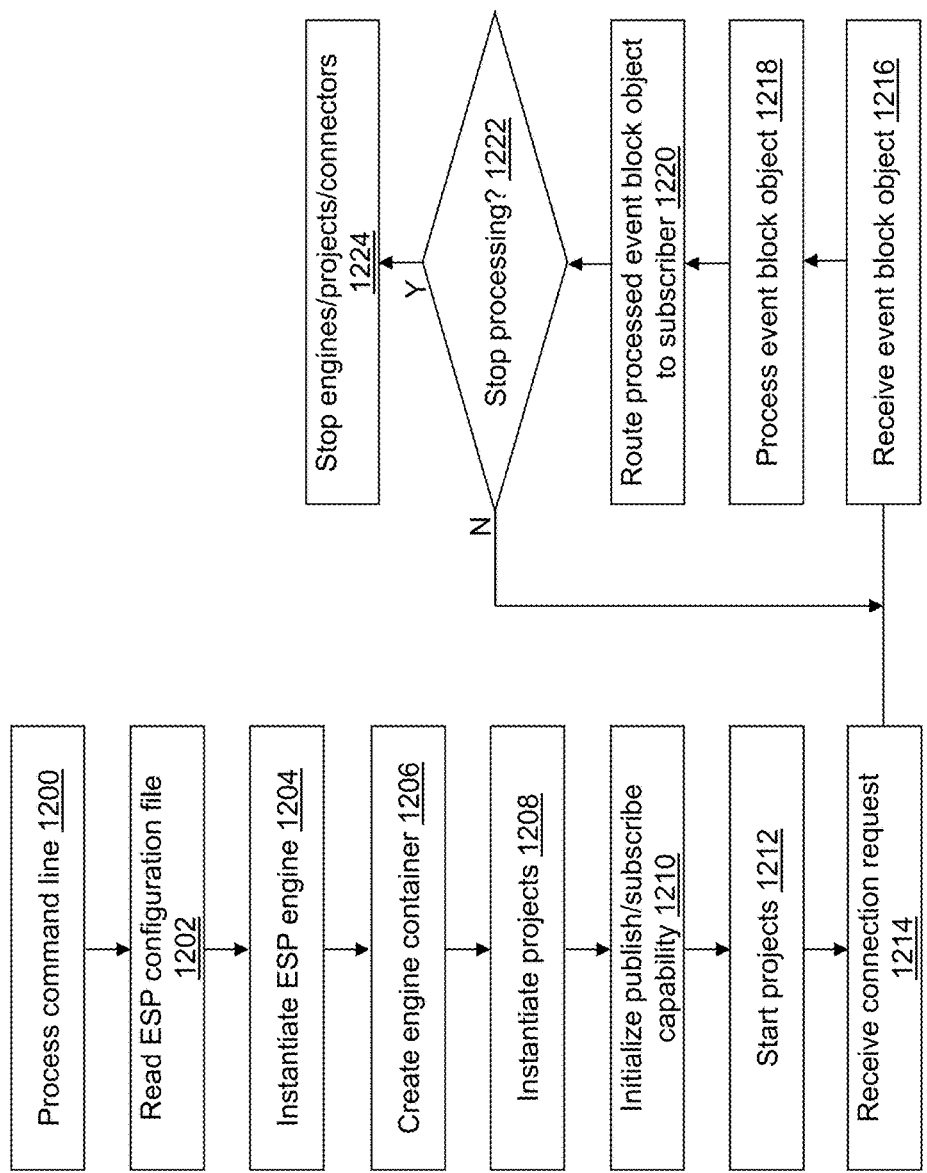
FIG. 12 depicts a flow diagram illustrating examples of operations performed by the ESP device of FIG. 11 in accordance with an illustrative embodiment.

Referring to FIG. 12, example operations associated with ESP application 1112 are described. ESP application 1112 defines how incoming event streams from event publishing system 502 are transformed into meaningful outgoing event streams consumed by event subscribing system 506. Additional, fewer, or different operations may be performed depending on the embodiment. The order of presentation of the operations of FIG. 12 is not intended to be limiting In an operation 1200, a command line is processed to initiate execution of ESP application 1112. A name and a location of ESP configuration file 1114 may be specified as an input parameter. In alternative embodiments, the command line parameters may be defined by default, input by a user through a user interface, etc.

In an operation 1202, ESP configuration file 1114 is read. For illustration, ESP configuration file 1114 may define an XML file that is parsed to define various parameters that are processed to dynamically control the operations performed by ESP application 1112.

The illustrative XML file schema used to define ESP configuration file 1114 may include definitions for an engine instance specification for ESPE 800 that again may be defined based on:

esp_engine_t=element esp-engine {
    attribute name {name_t},
    attribute host {string},
    attribute port {xsd:unsignedShort},
    attribute ha_port {xsd:unsignedShort}
} where the "name" attribute is a name of ESPE 800, the "host" attribute is a host name of the device executing ESPE 800, the "port" attribute is a port number for pub/sub to the device executing ESPE 800, and the "ha_port" attribute is a port number to the administrative server of the device executing ESPE 800. For example, HTTP requests are sent using the "ha_port" attribute; whereas, published events are sent using the "port" attribute.

In an operation 1204, ESPE 800 is instantiated based on the "start=engine" definition read from ESP configuration file 1114.

In an operation 1206, the engine container is created. For illustration, ESPE 800 may be instantiated using a function call that specifies the engine container as a manager for the model. The function call may include the engine name for ESPE 800 that may be unique to ESPE 800.

In an operation 1208, the one or more projects 802 defined by ESP configuration file 1114 are instantiated by ESPE 800 as a model. Instantiating the one or more projects 802 also instantiates the one or more continuous queries 804, the one or more source windows 806, and the one or more derived windows 808 read from ESP configuration file 1114. The one or more continuous queries 804 may be instantiated with a dedicated thread pool or pools that generate updates as new event block objects stream through ESPE 800.

In an operation 1210, the pub/sub capability is initialized for ESPE 800. In an illustrative embodiment, the pub/sub capability is initialized for each project of the one or more projects 802 read from ESP configuration file 1114.

In an operation 1212, the one or more projects 802 read from ESP configuration file 1114 are started. The one or more started projects may run in the background on ESP device 504.

In an operation 1214, a connection request is received from event publishing device 600 for a source window of ESPE 800 to which data will be published or from event subscribing device 900 for a derived window of ESPE 800 from which data will be received.

In an operation 1216, an event block object is received by ESPE 800 from event publishing device 600. An event block object containing one or more event objects is injected into a source window of the one or more source windows 806 read from ESP configuration file 1114.

In an operation 1218, the received event block object is processed through the one or more continuous queries 804 read from ESP configuration file 1114. For example, if event publishing device 600 is publishing event block objects with training data, the event block object may be received in a first source window and routed to a procedural window that performs the operations of FIGS. 2A to 2C on input data for training a predictive model. If event publishing device 600 is publishing event block objects with operational data similar to new dataset 324, the event block object may be received in a second source window and routed to a procedural window that performs operations 406 to 414 of FIG. 4 on event block objects that include operational data. Operation 406 of FIG. 4 may only be performed when a new predictive model is defined as a result of execution of the operations of FIGS. 2A to 2C with new input data.

In an operation 1220, the processed event block object is routed to event subscribing device 900. Subscribing devices can correlate a group of subscribed event block objects back to a group of published event block objects by comparing the unique ID of the event block object that a publisher, such as event publishing device 600, attached to the event block object with the event block ID received by a subscribing device, such as event subscribing device 900. The received event block objects further may be stored, for example, in a RAM or cache type memory of fifth computer-readable medium 1108. Event subscribing device 900 may receive the predicted response variable value from the procedural window that performs operation 410 of FIG. 4 on event block objects that include operational data.

In an operation 1222, a determination is made concerning whether or not processing is stopped. If processing is not stopped, processing continues in operation 1216 to continue receiving the one or more event streams containing event block objects from event publishing system 502. If processing is stopped, processing continues in an operation 1224.

In operation 1224, the started engines/projects/connectors are stopped and ESPE 800 is shutdown.

Example technology areas that can benefit from use of predictive model selection application 122 include health care organizations that can predict surgical site infections, ventilator-associated pneumonias, etc. In the area of IoT, predictive model selection application 122 can be used to pick the best model to predict which sensor will fail in the next week in the power smart grid. In the area of social network, predictive model selection application 122 can be used to pick the best model to predict which account is a fraud account (robots instead of human).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

read an input dataset that includes a plurality of observation vectors, wherein each observation vector of the plurality of observation vectors includes an explanatory variable value for an explanatory variable, a response variable value for a response variable, and a value of an event assessment variable;

select an assessment dataset from the input dataset using a first stratified sampling process based on the value of the event assessment variable of each observation vector;

allocate a remainder of the input dataset to a training/validation dataset;

partition the training/validation dataset into an oversampled training/validation dataset using an oversampling process based on a predefined value of the event assessment variable;

(a) select a validation sample from the oversampled training/validation dataset using a second stratified sampling process based on the value of the event assessment variable;

(b) select a training sample from the oversampled training/validation dataset using the second stratified sampling process based on the value of the event assessment variable, wherein the validation sample and the training sample are mutually exclusive;

(c) train a predictive type model using the selected training sample, wherein the predictive type model is trained to predict the response variable value of each observation vector included in the selected training sample based on a respective explanatory variable value of each observation vector;

(d) validate the trained predictive type model using the selected validation sample to compute a validation criterion value for the trained predictive type model that quantifies a validation error;

(e) score the validated predictive type model using the selected assessment dataset to compute a probability value for each observation vector and to compute an assessment criterion value for the validated predictive type model that quantifies a predictive performance capability for the validated predictive type model;

(f) store the computed assessment criterion value, a hyperparameter, model characteristics that define a trained model of the predictive type model, and the computed probability value for each observation vector of the selected assessment dataset to the computer-readable medium;

repeat (c) to (f) for at least one additional predictive type model;

determine a best predictive model based on the stored, computed assessment criterion value of each validated predictive type model; and output the hyperparameter and the model characteristics that define the trained model of the predictive type model associated with the determined best predictive model for predicting a new response variable value from a new observation vector.

2. The non-transitory computer-readable medium of claim 1, wherein (a) to (d) are performed a plurality of train/validate cycles before (e) is performed for the predictive type model.

3. The non-transitory computer-readable medium of claim 1, wherein the predictive type model is selected from the group consisting of a support vector machine model, a decision tree model, a forest model, a gradient boosting tree model, a neural network model, and a factorization machine model.

4. The non-transitory computer-readable medium of claim 1, wherein the assessment criterion value is an area under a receiver operating curve value, a misclassification rate value, and an F-score value.

5. The non-transitory computer-readable medium of claim 1, wherein the assessment criterion value is computed as a maximum difference value between a cumulative loss reduction value and a cumulative loss increase value.

6. The non-transitory computer-readable medium of claim 5, wherein the maximum difference value is computed by:

rank ordering each observation vector of the selected assessment dataset based on the stored probability value;

selecting an observation vector from the rank ordered observation vectors of the selected assessment dataset;

(g) selecting a loss reduction weight value for the selected observation vector;

(h) computing a loss reduction value by multiplying the selected loss reduction weight value by the response variable value of the selected observation vector;

(i) adding the computed loss reduction value to the cumulative loss reduction value;

(j) selecting a loss increase weight value for the selected observation vector;

(k) computing a loss increase value by multiplying the selected loss increase weight value by one minus the response variable value of the selected observation vector;

(l) adding the computed loss increase value to the cumulative loss increase value;

(m) computing a difference value between the cumulative loss reduction value and the cumulative loss increase value;

(n) storing the computed difference value in association with the stored probability value for the selected observation vector;

repeating (g) to (n) with a next observation vector selected from the rank ordered observation vectors as the selected observation vector until each observation vector of the selected assessment dataset is selected; and selecting a maximum value of the stored, computed difference values as the maximum difference value.

7. The non-transitory computer-readable medium of claim 6, wherein the stored probability value associated with the selected maximum value is output as a probability threshold for determining occurrence or not of an event.

8. The non-transitory computer-readable medium of claim 6, wherein the selected loss reduction weight value is a predefined constant value for each selected observation vector.

9. The non-transitory computer-readable medium of claim 6, wherein the selected loss reduction weight value is a value of a value variable defined for each selected observation vector.

10. The non-transitory computer-readable medium of claim 6, wherein the selected loss increase weight value is a predefined constant value for each selected observation vector.

11. The non-transitory computer-readable medium of claim 6, wherein the selected loss increase weight value is a value of a cost variable defined for each selected observation vector.

12. The non-transitory computer-readable medium of claim 1, wherein each observation vector of the plurality of observation vectors includes a plurality of explanatory variable values, wherein the explanatory variable value is one of the plurality of explanatory variable values.

13. The non-transitory computer-readable medium of claim 1, wherein the computer-readable instructions further cause the computing device to:
read a second explanatory variable value from a new dataset;
compute the new response variable value using the output hyperparameter, the output model characteristics, and the read second explanatory variable value; and
output the computed new response variable value.

14. The non-transitory computer-readable medium of claim 1, wherein the computer-readable instructions further cause the computing device to:
read a second explanatory variable value from a new dataset;
compute a new probability value using the output hyperparameter, the output model characteristics, and the read second explanatory variable value;
compare the computed new probability value to a probability threshold value; and
output an indicator of occurrence or not of an event based on the comparison.

15. The non-transitory computer-readable medium of claim 1, wherein the oversampling process randomly selects a first partition based on a predefined percentage of occurrences of the predefined value of the event assessment variable and randomly selects a second partition that includes a same number of observation vectors as the first partition from observation vectors of the training/validation dataset that do not have the predefined value of the event assessment variable.

16. The non-transitory computer-readable medium of claim 1, wherein the first stratified sampling process randomly selects a first partition based on a predefined percentage of the input dataset and based on the value of the event assessment variable so that the assessment dataset has a same distribution as the input dataset.

17. A computing device comprising:
a processor; and
a non-transitory computer-readable medium operably coupled to the processor, the computer-readable medium having computer-readable instructions stored thereon that, when executed by the processor, cause the computing device to
read an input dataset that includes a plurality of observation vectors, wherein each observation vector of the plurality of observation vectors includes an explanatory variable value for an explanatory variable, a response variable value for a response variable, and a value of an event assessment variable;
select an assessment dataset from the input dataset using a first stratified sampling process based on the value of the event assessment variable of each observation vector;
allocate a remainder of the input dataset to a training/validation dataset;
partition the training/validation dataset into an oversampled training/validation dataset using an oversampling process based on a predefined value of the event assessment variable;
(a) select a validation sample from the oversampled training/validation dataset using a second stratified sampling process based on the value of the event assessment variable;
(b) select a training sample from the oversampled training/validation dataset using the second stratified sampling process based on the value of the event assessment variable, wherein the validation sample and the training sample are mutually exclusive;
(c) train a predictive type model using the selected training sample, wherein the predictive type model is trained to predict the response variable value of each observation vector included in the selected training sample based on a respective explanatory variable value of each observation vector;
(d) validate the trained predictive type model using the selected validation sample to compute a validation criterion value for the trained predictive type model that quantifies a validation error;
(e) score the validated predictive type model using the selected assessment dataset to compute a probability value for each observation vector and to compute an assessment criterion value for the validated predictive type model that quantifies a predictive performance capability for the validated predictive type model;
(f) store the computed assessment criterion value, a hyperparameter, model characteristics that define a trained model of the predictive type model, and the computed probability value for each observation vector of the selected assessment dataset to the computer-readable medium;
repeat (c) to (f) for at least one additional predictive type model;
determine a best predictive model based on the stored, computed assessment criterion value of each validated predictive type model; and
output the hyperparameter and the model characteristics that define the trained model of the predictive type model associated with the determined best predictive model for predicting a new response variable value from a new observation vector.

18. A method of providing training and selection of a predictive model, the method comprising:
reading, by a computing device, an input dataset that includes a plurality of observation vectors, wherein each observation vector of the plurality of observation vectors includes an explanatory variable value for an explanatory variable, a response variable value for a response variable, and a value of an event assessment variable;

selecting, by the computing device, an assessment dataset from the input dataset using a first stratified sampling process based on the value of the event assessment variable of each observation vector;

allocating, by the computing device, a remainder of the input dataset to a training/validation dataset;

partitioning, by the computing device, the training/validation dataset into an oversampled training/validation dataset using an oversampling process based on a predefined value of the event assessment variable;

(a) selecting, by the computing device, a validation sample from the oversampled training/validation dataset using a second stratified sampling process based on the value of the event assessment variable;

(b) selecting, by the computing device, a training sample from the oversampled training/validation dataset using the second stratified sampling process based on the value of the event assessment variable, wherein the validation sample and the training sample are mutually exclusive;

(c) training, by the computing device, a predictive type model using the selected training sample, wherein the predictive type model is trained to predict the response variable value of each observation vector included in the selected training sample based on a respective explanatory variable value of each observation vector;

(d) validating, by the computing device, the trained predictive type model using the selected validation sample to compute a validation criterion value for the trained predictive type model that quantifies a validation error;

(e) scoring, by the computing device, the validated predictive type model using the selected assessment dataset to compute a probability value for each observation vector and to compute an assessment criterion value for the validated predictive type model that quantifies a predictive performance capability for the validated predictive type model;

(f) storing, by the computing device, the computed assessment criterion value, a hyperparameter, model characteristics that define a trained model of the predictive type model, and the computed probability value for each observation vector of the selected assessment dataset to the computer-readable medium;

repeating, by the computing device, (c) to (f) for at least one additional predictive type model;

determining, by the computing device, a best predictive model based on the stored, computed assessment criterion value of each validated predictive type model; and outputting, by the computing device, the hyperparameter and the model characteristics that define the trained model of the predictive type model associated with the determined best predictive model for predicting a new response variable value from a new observation vector.

19. The method of claim 18, wherein (a) to (d) are performed a plurality of train/validate cycles before (e) is performed for the predictive type model.

20. The method of claim 18, wherein the assessment criterion value is computed as a maximum difference value between a cumulative loss reduction value and a cumulative loss increase value.

21. The method of claim 20, wherein the maximum difference value is computed by:

rank ordering each observation vector of the selected assessment dataset based on the stored probability value;

selecting an observation vector from the rank ordered observation vectors of the selected assessment dataset;

(g) selecting a loss reduction weight value for the selected observation vector;

(h) computing a loss reduction value by multiplying the selected loss reduction weight value by the response variable value of the selected observation vector;

(i) adding the computed loss reduction value to the cumulative loss reduction value;

(j) selecting a loss increase weight value for the selected observation vector;

(k) computing a loss increase value by multiplying the selected loss increase weight value by one minus the response variable value of the selected observation vector;

(l) adding the computed loss increase value to the cumulative loss increase value;

(m) computing a difference value between the cumulative loss reduction value and the cumulative loss increase value;

(n) storing the computed difference value in association with the stored probability value for the selected observation vector;

repeating (g) to (n) with a next observation vector selected from the rank ordered observation vectors as the selected observation vector until each observation vector of the selected assessment dataset is selected; and selecting a maximum value of the stored, computed difference values as the maximum difference value.

22. The method of claim 21, wherein the stored probability value associated with the selected maximum value is output as a probability threshold for determining occurrence or not of an event.

23. The method of claim 21, wherein the selected loss reduction weight value is a predefined constant value for each selected observation vector.

24. The method of claim 21, wherein the selected loss reduction weight value is a value of a value variable defined for each selected observation vector.

25. The method of claim 21, wherein the selected loss increase weight value is a predefined constant value for each selected observation vector.

26. The method of claim 21, wherein the selected loss increase weight value is a value of a cost variable defined for each selected observation vector.

27. The method of claim 18, further comprising:

reading, by the computing device, a second explanatory variable value from a new dataset;

computing, by the computing device, the new response variable value using the output hyperparameter, the output model characteristics, and the read second explanatory variable value; and outputting, by the computing device, the computed new response variable value.

28. The method of claim 18, further comprising:

reading, by the computing device, a second explanatory variable value from a new dataset;

computing, by the computing device, a new probability value using the output hyperparameter, the output model characteristics, and the read second explanatory variable value;

comparing, by the computing device, the computed new probability value to a probability threshold value; and outputting, by the computing device, an indicator of occurrence or not of an event based on the comparison.

29. The method of claim 18, wherein the oversampling process randomly selects a first partition based on a predefined percentage of occurrences of the predefined value of the event assessment variable and randomly selects a second partition that includes a same number of observation vectors as the first partition from observation vectors of the training/validation dataset that do not have the predefined value of the event assessment variable.

30. The method of claim 18, wherein the first stratified sampling process randomly selects a first partition based on a predefined percentage of the input dataset and based on the value of the event assessment variable so that the assessment dataset has a same distribution as the input dataset.

* * * * *